US 12,268,329 B2

(12) United States Patent
Cira et al.

(10) Patent No.: US 12,268,329 B2
(45) Date of Patent: Apr. 8, 2025

(54) GRILL BASKET

(71) Applicant: Proud Grill Company Limited, King City (CA)

(72) Inventors: Paul Cira, Toronto (CA); Bartek Zalewski, Richmond Hill (CA)

(73) Assignee: Proud Grill Company Limited, King City (CA)

( * ) Notice: Subject to any disclaimer, the term of this patent is extended or adjusted under 35 U.S.C. 154(b) by 116 days.

(21) Appl. No.: 17/838,427

(22) Filed: Jun. 13, 2022

(65) Prior Publication Data
US 2023/0000282 A1    Jan. 5, 2023

Related U.S. Application Data

(60) Provisional application No. 63/216,867, filed on Jun. 30, 2021.

(51) Int. Cl.
*A47J 36/24*    (2006.01)
*A23L 5/10*    (2016.01)
(Continued)

(52) U.S. Cl.
CPC .............. *A47J 37/049* (2013.01); *A23L 5/10* (2016.08); *A47J 37/0786* (2013.01); *A47J 45/071* (2013.01); *A47J 45/10* (2013.01)

(58) Field of Classification Search
CPC .. A47J 37/049; A47J 37/0786; A47J 37/1295; A47J 45/071; A47J 45/10; A47J 45/061; A23L 5/10; B65D 7/20
(Continued)

(56) References Cited

U.S. PATENT DOCUMENTS

D296,643 S    7/1988    Mueller
D304,991 S    12/1989    Roberge
(Continued)

FOREIGN PATENT DOCUMENTS

CN    305572937    1/2020
CN    305615994    2/2020
(Continued)

OTHER PUBLICATIONS

Yukon Glory BBQ N Serve Grill Basket Set, Oct. 28, 2020, https://www.amazon.com/Yukon-Glory-Baskets-Serving-Grilling/dp /B08M445W6G (Year: 2020).
(Continued)

*Primary Examiner* — Don M Anderson
*Assistant Examiner* — Elizabeth J Volz
(74) *Attorney, Agent, or Firm* — Sand, Sebolt & Wernow Co., LPA

(57) ABSTRACT

A grill basket including a basket portion having a bottom with sides extending upwardly and outwardly therefrom. A handle is removably engageable with one of a plurality of engagement assemblies that are provided on different sides of the basket portion. The handle is selectively engaged with different engagement assemblies in order to change the orientation in which the grill basket is able to be used. The grill basket further includes one or more removable dividers that are movable between a storage position and a use position. In the storage position the one or more dividers are located proximate one or more sides of the basket portion and an interior compartment of the basket portion is substantially the same size as when the one or more dividers are completely removed from the basket portion. In the use position, the dividers are placed to divide the interior compartment into smaller compartments.

19 Claims, 18 Drawing Sheets

(51) Int. Cl.
*A47J 37/04* (2006.01)
*A47J 37/07* (2006.01)
*A47J 45/07* (2006.01)
*A47J 45/10* (2006.01)

(58) Field of Classification Search
USPC ....... 220/757, 529, 543, 752, 755, 485, 759, 220/912, 573.1
See application file for complete search history.

(56) References Cited

U.S. PATENT DOCUMENTS

| | | | |
|---|---|---|---|
| 5,048,882 A * | 9/1991 | Fielding | A47J 45/07 294/33 |
| D532,654 S | 11/2006 | Raichlen et al. | |
| D629,662 S | 12/2010 | Thompson | |
| D702,084 S | 4/2014 | Matos | |
| 9,204,754 B1 * | 12/2015 | Bourgeois | A47J 37/0611 |
| 9,220,371 B1 * | 12/2015 | Demirakos | A47J 37/1295 |
| D825,266 S | 8/2018 | Torio et al. | |
| D825,267 S | 8/2018 | Torio et al. | |
| D825,268 S | 8/2018 | Torio et al. | |
| D834,889 S | 12/2018 | Moon et al. | |
| D853,787 S | 7/2019 | Moon et al. | |
| D876,161 S | 2/2020 | Covert et al. | |
| D876,162 S | 2/2020 | Covert et al. | |
| D891,864 S | 8/2020 | Covert et al. | |
| D968,891 S | 11/2022 | Zemel et al. | |
| 2022/0408971 A1 | 12/2022 | Leng | |

FOREIGN PATENT DOCUMENTS

| | | |
|---|---|---|
| CN | 305874957 | 6/2020 |
| CN | 306044769 | 9/2020 |
| CN | 306153919 | 11/2020 |

OTHER PUBLICATIONS

Yardwe Barbecue Nonstick Pan Grill Skillet Grill Topper Tray, Sep. 29, 2020, https://www.amazon.co.uk/Yardwe-Barbecue-Nonstick-Skillet-Foldable/dp/B08KDP4NTH (Year: 2020).

IPeak BBQ Grill Basket Barbecue, Mar. 18, 2021, https://www.amazon.co.uk/ i PEAK-Barbecue-Accessory-Barbequing-Vegetables/dp/B08ZDPKXGV (Year: 2021).

Com-Four BBQ Grill pan, Apr. 8, 2021, https://www.amazon.co.uk/COM-FOUR%C2%AE-Stainless-Practical-Handles-Vegetables/dp/B0922844M8 (Year: 2021).

Shizzo Grill Basket Value Set, Aug. 1, 2020, https://www.amazon.com/Accessories-Stainless-Grilling-Portable-Vegetables/dp/B0887M8J8W (Year: 2020).

Grillers Choice Grill Basket, Jan. 13, 2021, https://www.amazon.com/Grillers-Choice-Grill-Basket-Accessories/dp/B08SW6B2NW (Year: 2021).

* cited by examiner

FIG. 1A

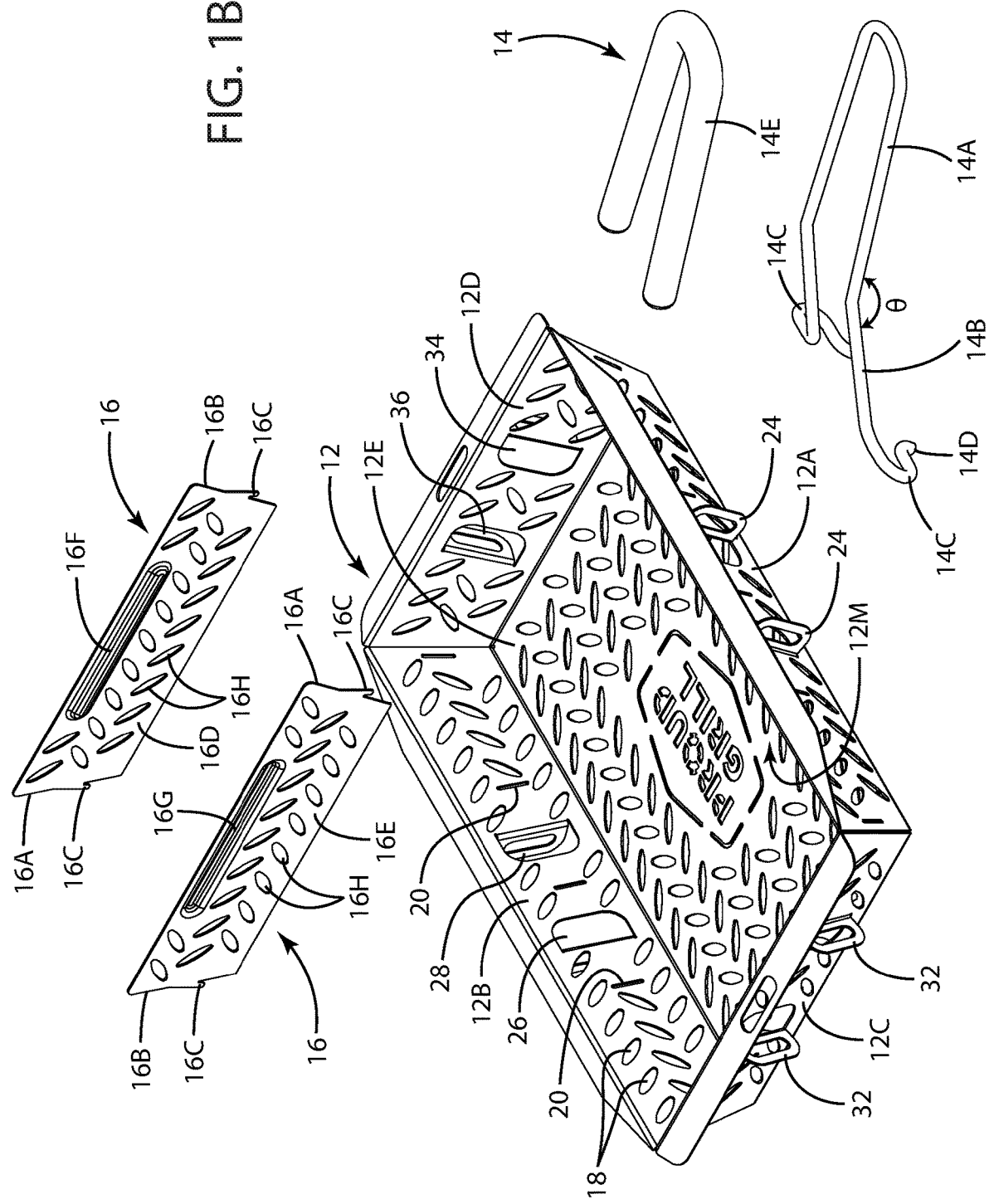

GRILL BASKET

CROSS-REFERENCE TO RELATED APPLICATIONS

This application claims the benefit of U.S. Provisional Patent Application Ser. No. 63/216,867, filed Jun. 30, 2021, the entire disclosure of which is incorporated herein by reference.

TECHNICAL FIELD

This disclosure is directed to a grill basket. More particularly, this disclosure is related to a grill basket with a removable handle. Specifically, this disclosure is related to a grill basket with a removable handle and two or more engagement assemblies provided on a basket portion of the grill basket. The two or more engagement assemblies enable the handle to be removably engaged with the basket portion in different locations so that the grill basket is usable in more than one orientation. The disclosure further relates to a grill basket having one or more selectively removable dividers which allow for selective separation of regions of the grill basket interior.

BACKGROUND

Background Information

Cooking on a grill is a popular method of preparing food. Some grills are heated by charcoal, others are gas powered, and, more recently, some are powered by infrared elements. Food is placed onto a metal grate provided in the grill and the food is cooked by its close proximity to heat produced by one of the aforementioned methods. The foods are heated and cooked to the desired degree and the flavor profile of some foods may be enhanced by caramelization through the exposure of the food to heat.

At times, if a user has to step away from the grill for too long or is inexperienced with cooking a particular food, the food being cooked may end up sticking to the grill's grate. This may result in the food becoming burned and/or blackened and the food may also be difficult to remove from the grate without comprising the integrity of the food item. Furthermore, grilling irregularly-shaped foodstuffs can prove challenging as it may be difficult to find suitable surfaces on the food item to expose to heat in order to cook the food in an even manner. Additionally, small pieces of food may tend pass through the spaces in the grate of the grill, attaching themselves to the heating element and burning up, thereby causing smoke to billow from the grill.

After use of the grill it is likely that the grate will have accumulated some grease and charred food thereon from the cooking process. Typically the grill is too hot to clean immediately after use and a user may not remember to clean the grill prior to the next use. If the grates are not adequately cleaned after prolonged use of a grill there can be a grease and burned foods on the grate and this can lead to a fire risk or to the imparting of undesirable flavors to food that is subsequently cooked on the grill.

In recent years, various grill pans or grill baskets have been introduced to try and address some of the above-mentioned issues. These grill pans or baskets (which will be referred to hereafter as "grill baskets" or "baskets") frequently include a statically-connected handle for the user to grip and thereby manipulate the grill basket. In some instances, the handles are integrally formed with the grill basket and are therefore in a fixed location and orientation relative to the basket. In other instances, the handles are engaged with the grill basket so as to be movable between a folded storage position and an expanded use position. In many instances, the handles are elongate and extend for a distance outwardly from the basket to ensure that a user's hand will be kept some distance away from the grill's heat source. The nature of the long handle means that the grill basket may only be able to be used in one orientation so as to best keep the user's hand a distance from the heat source. If integral with the grill basket, these elongate handles can make it difficult to clean the grill basket as the handle may prevent the grill basket from easily fitting into a dishwasher or sink.

SUMMARY

The present disclosure relates to a grill basket with a handle that is easily engaged with and disengaged from the basket in a number of different locations thereby enabling the basket to be used in different orientations. One or more dividers are selectively engaged with the grill basket to selectively compartmentalize the same in a variety of different ways to suit the food to be cooked therein.

In one aspect, an exemplary embodiment of the present disclosure may provide a grill basket comprising a basket portion having a bottom and a side wall upwardly from the bottom; a first engagement assembly provided on the side wall; a second engagement assembly provided on the side wall spaced from the first engagement assembly; and a handle; wherein the handle is operative to be selectively removably connected to the basket portion via one of the first engagement assembly and the second engagement assembly.

In one embodiment connection of the handle with the first engagement assembly may orient the basket portion in a first orientation, and connection of the handle with the second engagement assembly may orient the basket portion in a second orientation. In one embodiment, the first side and second side of the basket portion may be at right angles to the third side and the fourth side; and wherein when the handle of the first engagement assembly is provided on the first side or the second side and the second engagement assembly is provided on the third side or the fourth side, then the first orientation of the basket portion may be at right angles to the second orientation of the basket portion.

In one embodiment, each of the first engagement assembly and the second engagement assembly may include at least one tab which extends outwardly from an outer surface of the one of the first side, the second side, the third side, and the fourth side; wherein the at least one tab defines an opening therein; and wherein a portion of the handle is received through the opening. In one embodiment, the handle may include a first arm with a free end and an engagement region positioned inwardly of the free end; and wherein the engagement region of the handle is received through the opening. In one embodiment, the engagement region may be arcuate.

In one embodiment, the grill basket may further comprise a latching member provided on the handle. In one embodiment, the latching member may comprise an extension tip provided at the free end of the first arm, wherein the extension tip prevents the free end of the arm from moving through the opening in the tab. In one embodiment, the handle may comprise a first arm and a second arm extending outwardly from an end in generally a same direction, wherein each of the first arm and the second arm has an engagement region positioned inwardly of a free end; and wherein the engagement region of the handle may be configured to be releasably connected to the one of the first engagement assembly and the second engagement assembly. In one embodiment, each of the first engagement assembly and the second engagement assembly may comprise a first tab and a second tab extending outwardly from the associated first side, second side, third side, and fourth side, wherein each of the first tab and the second tab defines an opening therein, and wherein the engagement region of the first arm may be receivable in the opening of the first tab and the engagement region of the second arm may be receivable in the opening of the second tab. In one embodiment, the grill basket may further comprise at least one divider that may be removably engageable with the basket portion to divide the interior compartment into smaller compartment sections.

In another aspect, an exemplary embodiment of the present disclosure may provide a grill basket comprising a basket portion having a bottom, a first side, a second side, a third side, a fourth side extending upwardly and outwardly from the bottom; wherein the first side and the second side are opposed; and wherein the third side and the fourth side are opposed and extend between the first side and the second side; an interior compartment defined by inner surfaces of the bottom, the first side, the second side, the third side, and the fourth side; and at least one divider that is removably engageable with the basket portion to divide the interior compartment into smaller compartment sections.

In one embodiment, one or more first connector apertures may be defined in the first side; one or more second connector apertures may be defined in the second side; wherein each of the one or more first connector apertures may be aligned with one of the one or more second connector apertures. In one embodiment, a first projection may be provided on a first end of the divider and a second projection may be provided on a second end of the divider; and wherein the first projection is engaged in one of the one or more first connector apertures and the second projection is engaged in one of the one or more second connector apertures to secure the divider to the basket portion. In one embodiment, the one or more first connector apertures may include a center connector aperture defined in the first side and located equidistant between the third side and the fourth side; wherein the one or more second connector apertures may include a center connector aperture defined in the second side and located equidistant between the third side and the fourth side; and when the divider is removably engaged with the center connector aperture on the first side and the center connector aperture on the second side the compartment is divided in half by the divider.

In one embodiment, the one or more first connector apertures may include an outermost connector aperture defined in the first side and located proximate one of the third side and the fourth side; the one or more second connector apertures may include an outermost connector aperture defined in the second side and located proximate the one of the third side and the fourth side; and wherein the divider is removably engaged with the outermost connector aperture on the first side and the outermost connector aperture on the second side. In one embodiment, the one of the third side and the fourth side may be oriented at an obtuse angle relative to the inner surface of the bottom and the outermost connector aperture on the first side and the outermost connector aperture on the second side may be oriented at the obtuse angle relative to the inner surface of the bottom. In one embodiment, each of the first projection and the second projection on the divider may comprise a triangular hook that extends outwardly from the respective one of the first end and the second end of the divider.

In one embodiment, a plurality of through-holes may be defined in one or more of the first side, the second side, the third side, the fourth side, and the bottom of the basket portion and the through-holes extend between an inner surface and outer surface of the basket portion, and wherein a further plurality of through-holes may be defined in the at least one divider and extend between a first surface and a second surface of the at least one divider. In one embodiment, the grill basket may further comprise a handle; and a first engagement assembly provided on one of the first side, the second side, the third side, and the fourth side; wherein the handle may be selectively removably engaged with the first engagement assembly. In one embodiment, the grill basket may further comprise a second engagement assembly provided on another of the first side, the second side, the third side, and the fourth side of the basket portion; wherein the handle may be selectively removably engaged with the second engagement assembly.

In another aspect, an exemplary embodiment of the present disclosure may provide a method for operating a grill basket comprising squeezing a grasping portion of a handle; placing an engagement region of the handle into an opening defined by a tab of a first engagement assembly located on a side of a basket portion of the grill basket; releasing the grasping portion of the handle; coupling the engagement region to the handle to the first engagement assembly; squeezing the grasping portion of the handle again; disengaging the engagement region of the handle from the first engagement assembly; moving the engagement region of the handle into an opening defined by a further tab of a second engagement assembly located on a different side of the basket portion; releasing the grasping portion of the handle; coupling the engagement region to the handle to the second engagement assembly. In one embodiment the method may further comprise engaging a removable divider between two opposing sides of the basket portion; dividing an interior compartment defined by the basket portion with the divider; placing foodstuffs for grilling into the basket portion on either side of the divider; and grilling the foodstuffs.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

FIG. 1A is a top, left side, rear perspective view of a grill basket in accordance with an aspect of the present disclosure, with the grill basket shown with the removable handle engaged with a front wall of the basket and two dividers engaged with the basket to compartmentalize the same.

FIG. 1B is an exploded top, left side, front perspective view of the grill basket of FIG. 1.

Similar numbers refer to similar parts throughout the drawings.

DETAILED DESCRIPTION

Figure 2:
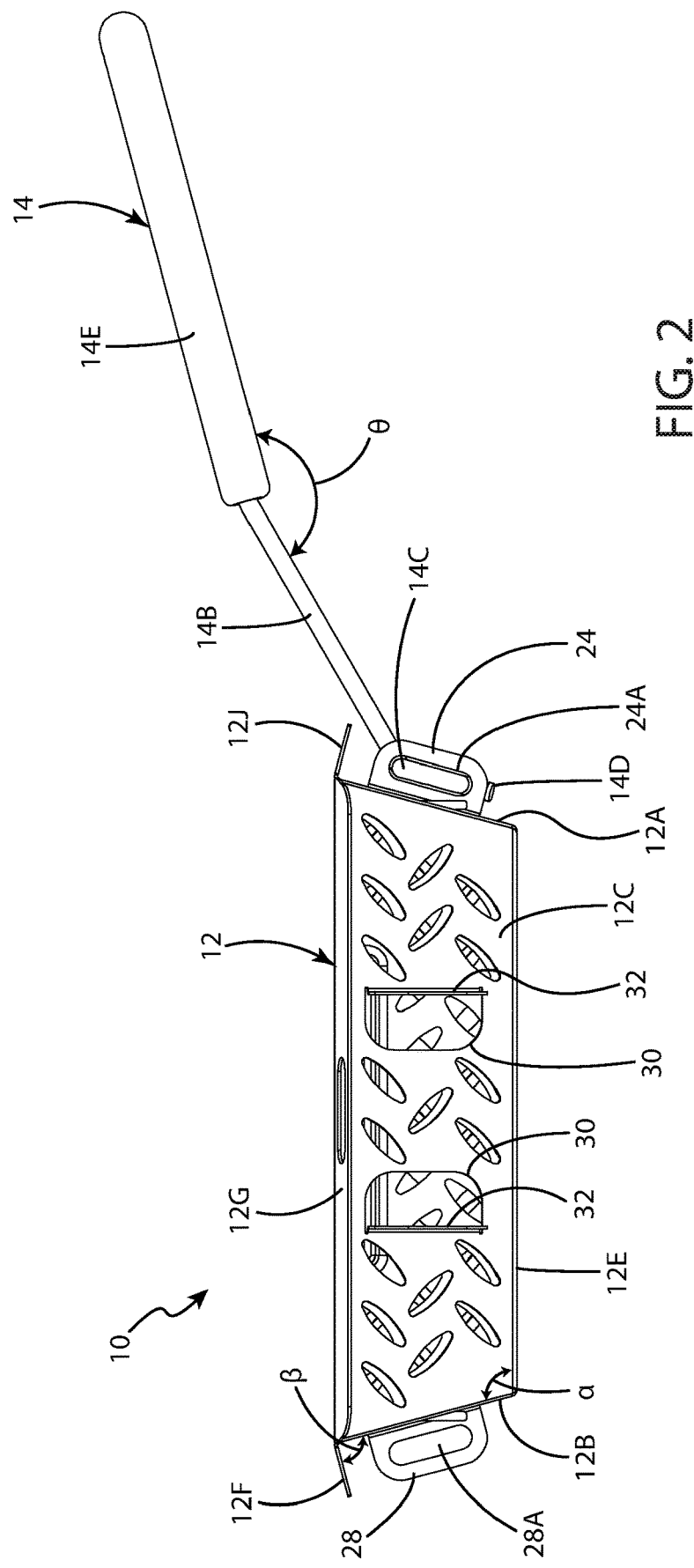
FIG. 2 is a left side elevation view of the grill basket.
Figure 3:
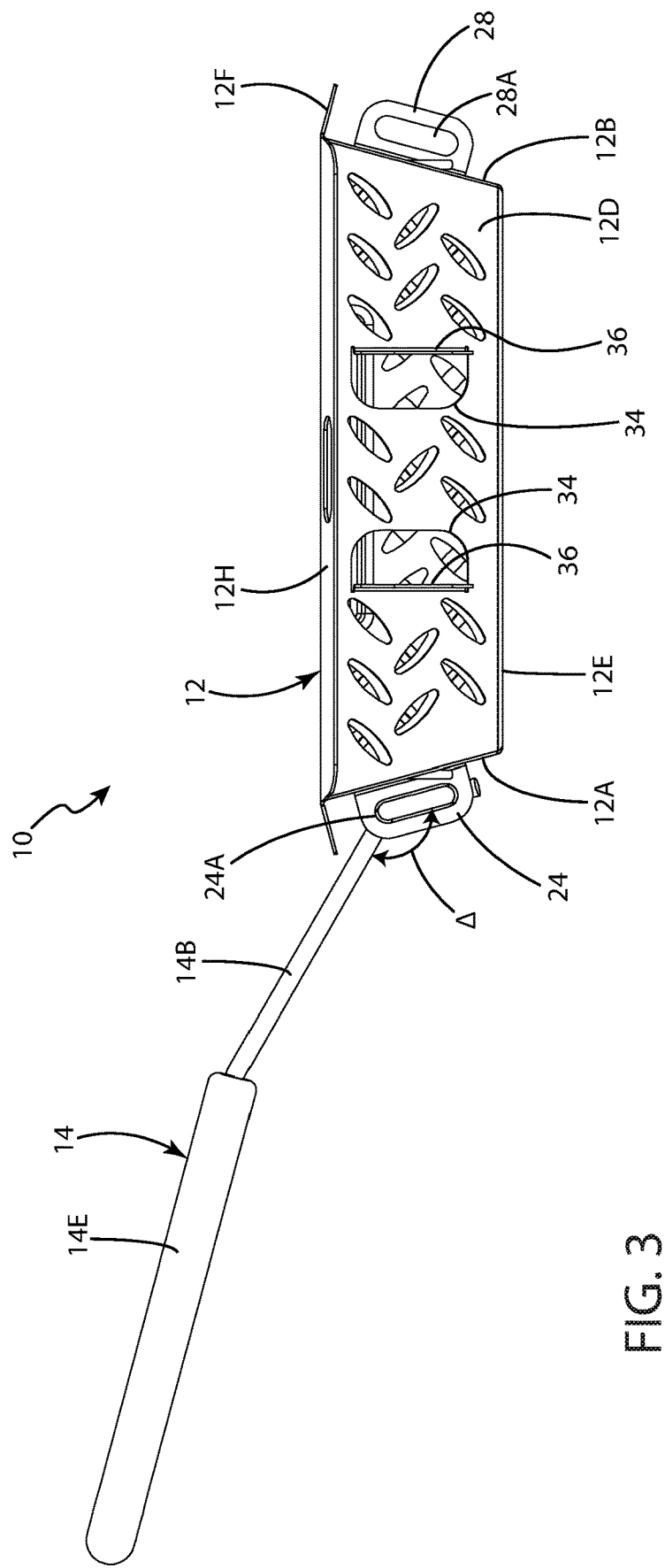
FIG. 3 is a right side elevation view of the grill basket.

A new grill basket 10 and method of operation thereof is discussed in the present disclosure and is depicted in the accompanying FIGS. 1A-17. Basket 10 is a new and improved apparatus for holding food to be cooked on a grill, as will be discussed hereafter.

Figure 1A:
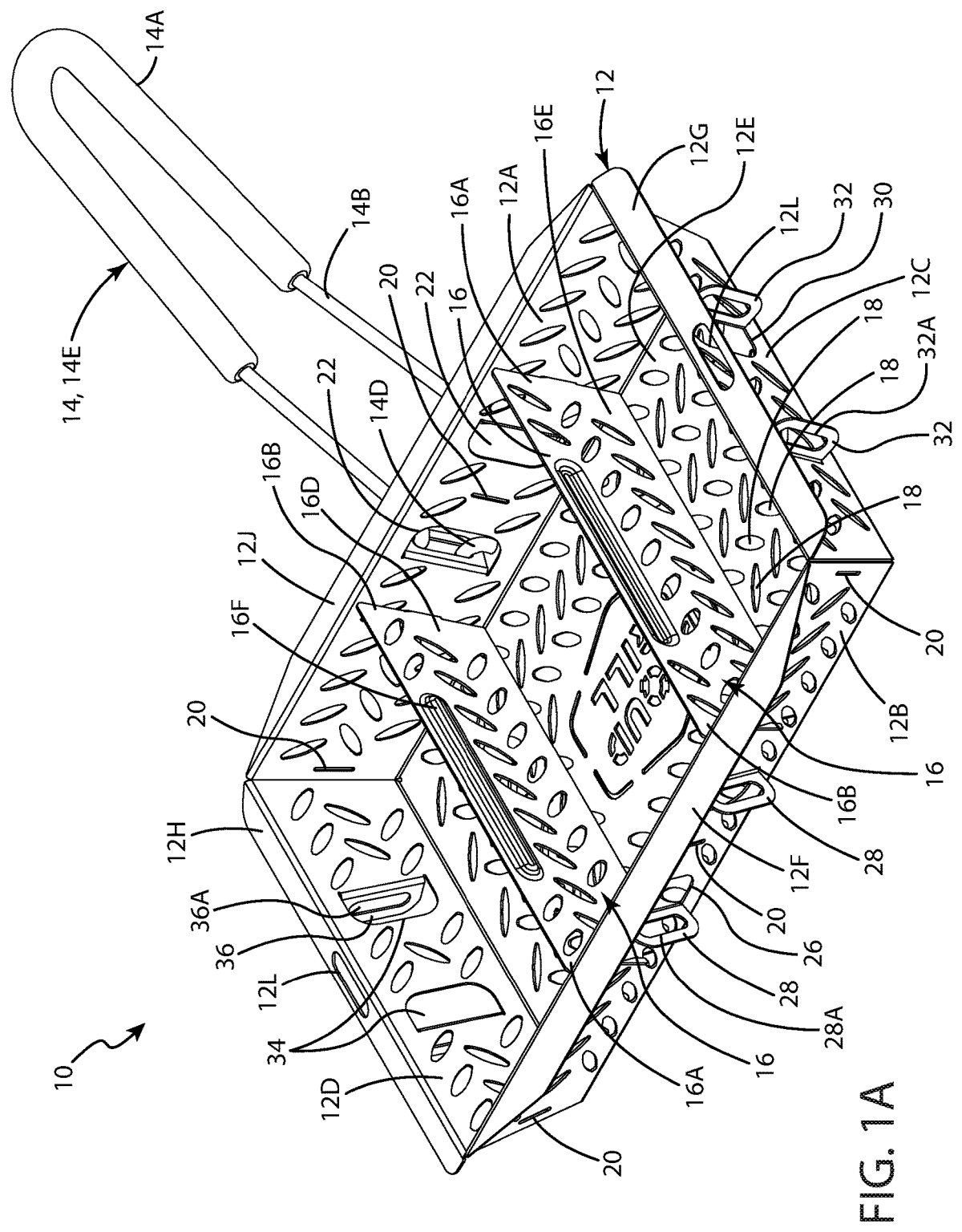

Referring to FIGS. 1A through 8, and specifically to FIG. 1A and FIG. 1B, an exemplary grill basket 10 in accordance with the present disclosure is shown. In an exemplary embodiment, grill basket 10 includes a basket portion 12, a handle 14, and one or more dividers 16. Handle 14 may optionally be engaged with basket portion 12 in a variety of different locations, as will be discussed later herein, and thereby enables grill basket 10 to be used in more than one orientation. One or more of dividers 16 may optionally be engaged with the basket portion 12 to compartmentalize basket portion 12 in a variety of different ways, as will be discussed later herein.

Basket portion 12 preferably is fabricated from a material that is capable of being heated on a grate of a BBQ or oven grill. One suitable material for basket portion 12 is stainless steel, particularly solid stainless steel. Basket portion 12 as illustrated includes a side wall and a bottom that bound and define a compartment into which foodstuffs are able to be placed for grilling. In the exemplary embodiment illustrated in the attached drawings, the side wall is generally rectangular and comprises a first side 12A, a second side 12B laterally opposed to first side 12A, a third side 12C spanning between first side 12A and second side 12B and perpendicular thereto, and a fourth side 12D longitudinally opposed from third side 12C and spanning between first side 12A and second side 12B and perpendicular thereto. The side wall comprising the first side 12A, second side 12B, third side 12C, and fourth side 12D extending upwardly and outwardly from a bottom 12E of basket portion 12. Bottom 12E forms a bottom surface of the basket portion 12 that will rest upon a grate of a grill. An upper surface of bottom 12E will support foodstuffs thereon for cooking. Bottom 12E is planar and each of first side 12A, second side 12B, third side 12C, and fourth side 12D extend upwardly and angle outwardly away from bottom 12E. In particular, first side 12A, second side 12B, third side 12C, and fourth side 12D are oriented at an angle α (FIG. 8) with respect to the upper surface of bottom 12E. In the exemplary embodiment, the angle α is from about 95 degrees up to about 130 degrees. In a further embodiment, the angle α may be from about 100 degrees up to about 120 degrees. In a particular further embodiment, the angle α is about 105 degrees relative to the upper surface of bottom 12E.

While basket portion 12 is illustrated in the attached figures as being generally rectangular in shape when viewed from above, it will be understood that in other embodiments, the basket portion 12 may be of any other desired shape.

An upper end of each of first side 12A, second side 12B, third side 12C, and fourth side 12D remote from bottom 12E is angled to form a lip that extends outwardly and downwardly from the upper end. This can be seen in FIG. 2, for example. An upper end of first side 12A forms a first lip 12J, an upper end of second side 12B forms a second lip 12F, an upper end of third side 12C forms a third lip 12G, and an upper end of fourth side 12D forms a fourth lip 12H. First lip 12J is of a greatest width proximate a center region of first side 12A and first lip 12F tapers in width approaching each of third side 12C and fourth side 12D. (The width of the lip 12J is measured from where the lip 12J originates in first side 12A to an outermost free end that is parallel to first side 12A.) Similarly second lip 12F is of a greatest width proximate a center region of second side 12B and the second lip 12F tapers in width approaching each of third side 12C and fourth side 12D. The lips 12E and 12F are thereby configured to be trapezoidal in shape. This can best be seen in FIG. 6.

Third lip 12G and fourth lip 12H are both of a generally constant width along their lengths from proximate first side 12A to proximate second side 12B. Each end of the third lip 12G and the fourth lip 12H forms a rounded corner region proximate first lip 12J and second lip 12F. Each lip 12J, 12F, 12G, and 12H is arranged at an angle β (FIG. 2) with respect to an exterior surface of its respective side. In the exemplary embodiment, the angle β is from about 80 degrees up to about 100 degrees. In a further exemplary embodiment, the angle β is about 90 degrees. The angle β is such that the lips 12E through 12H angle outwardly and downwardly from an upper edge of the basket portion 12.

Figure 6:
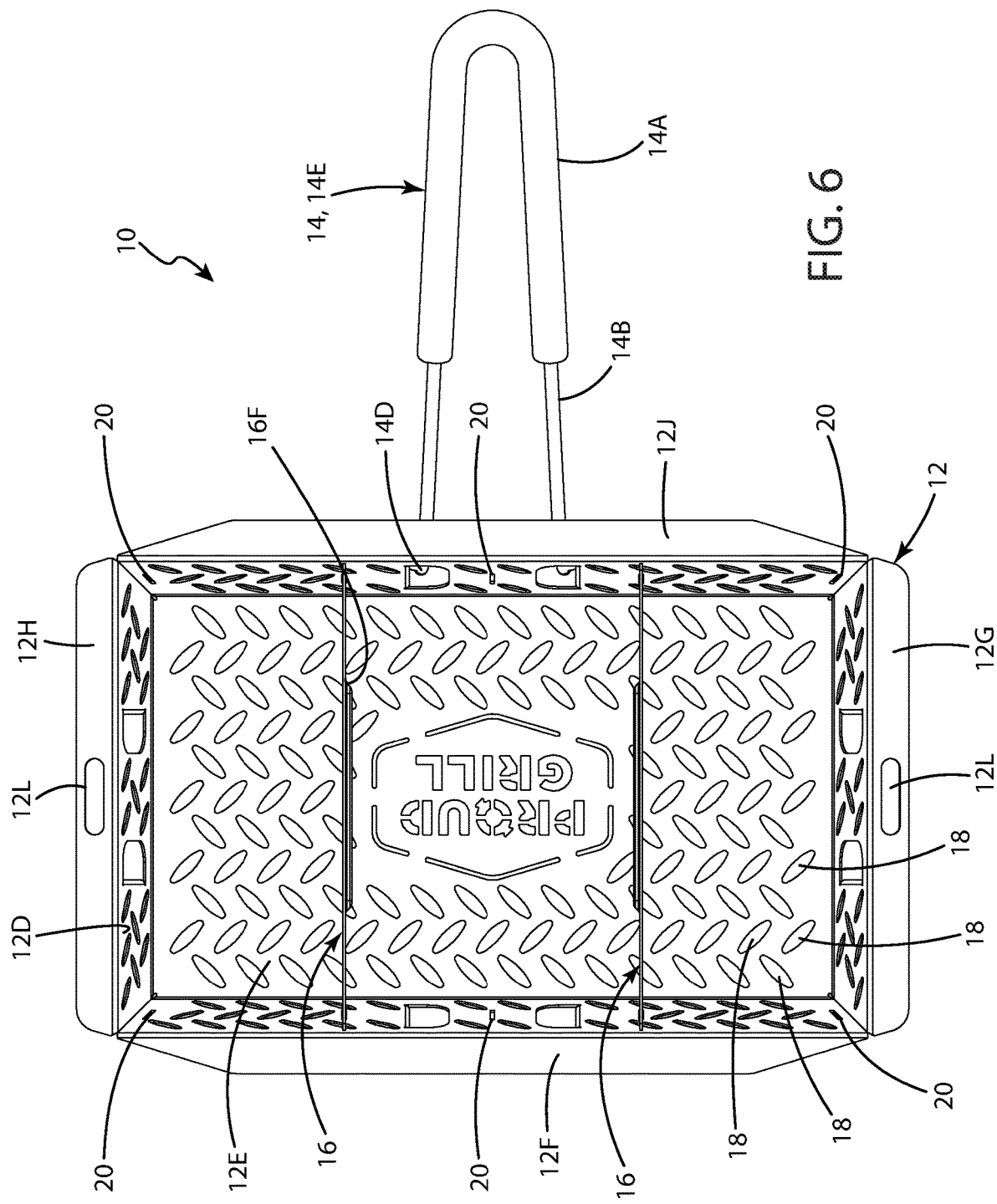
FIG. 6 is top plan view of the grill basket.
Figure 7:
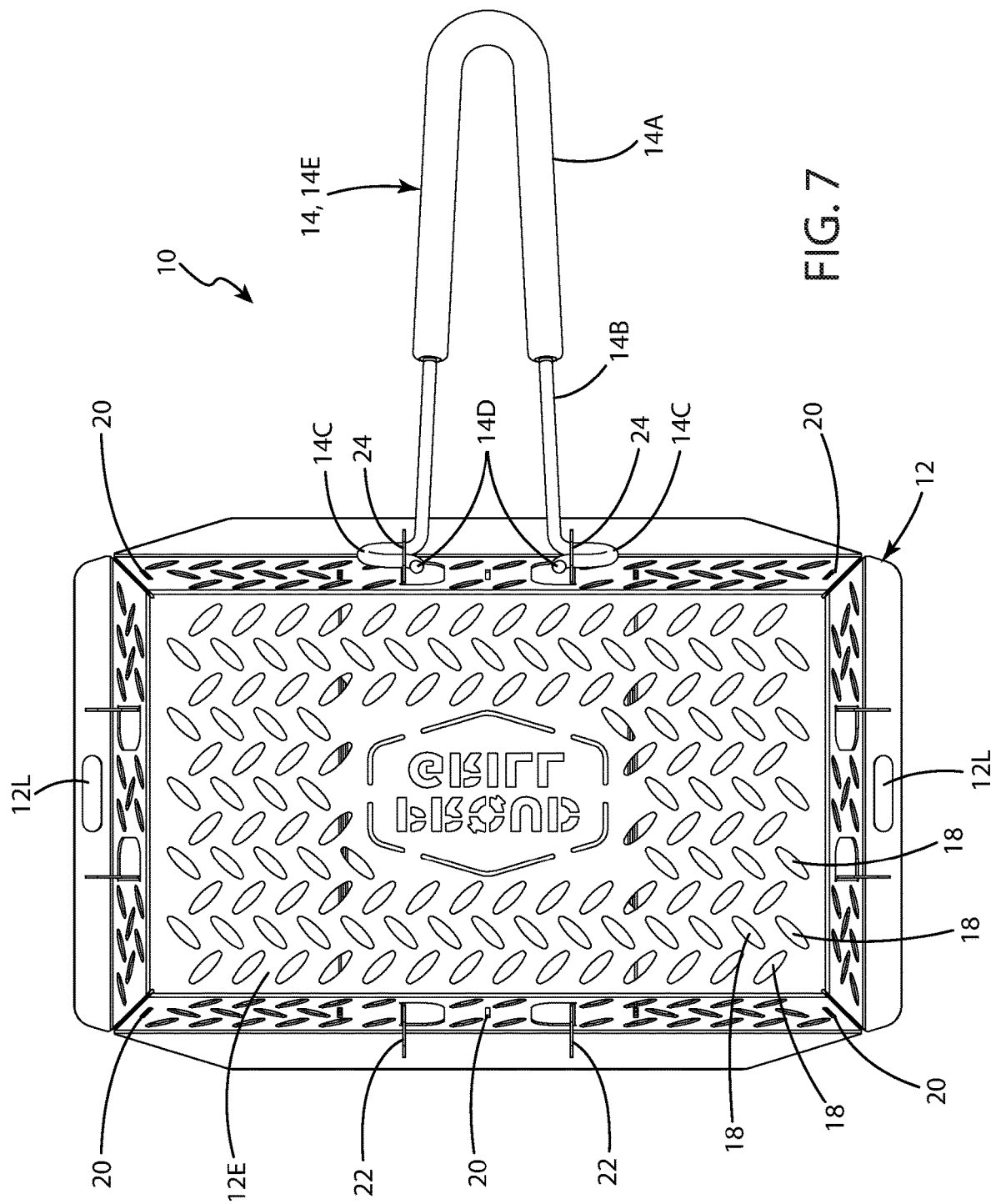
FIG. 7 is a bottom plan view of the grill basket.
Figure 8:
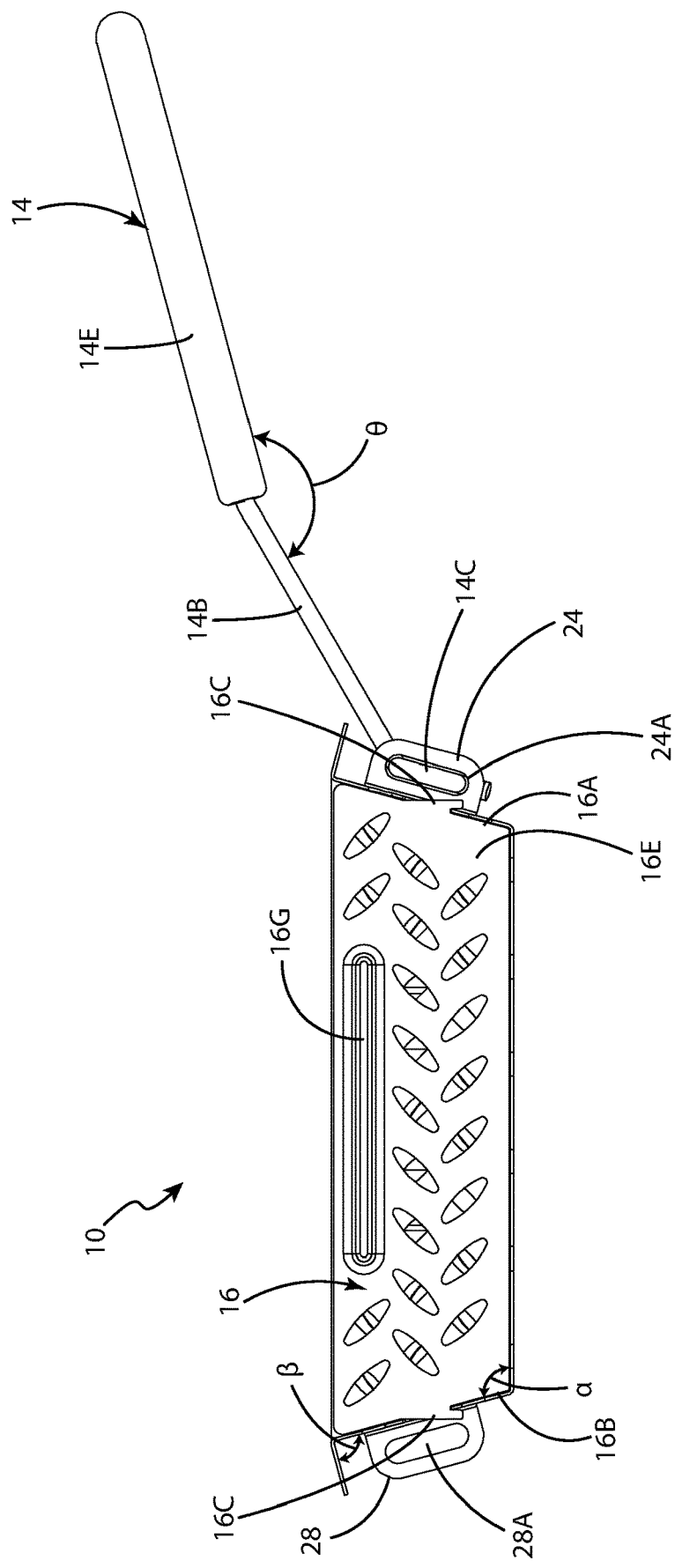
FIG. 8 is a vertical cross-section of the grill basket taken along line 8-8 of FIG. 4.

As best seen in FIG. 6, each of the third lip 12G and fourth lip 12H define an aperture 12L therein. The aperture 12L extends from an upper surface of the respective lip 12G, 12H to a lower surface thereof. In the exemplary embodiment each aperture 12L is generally oval in shape but it will be understood that in other embodiments a differently configured apertures may be defined in the lips 12G and 12H. Apertures 12L may be utilized to hang grill basket 10 when not in use.

First side 12A, second side 12B, third side 12C, fourth side 12D, and bottom 12E bound an define an interior 12M (FIG. 1B) into which one or more food items may be placed for cooking. A plurality of apertures is defined in each of first side 12A, second side 12B, third side 12C, fourth side 12D, and bottom 12E of basket portion 12. Each through-hole 18 extends between an inner surface and an outer surface of the respective one of the first side 12A, second side 12B, third side 12C, fourth side 12D, and bottom 12E. Through-holes 18 allow for airflow and heat flow around the food items retained interior 12M in the grill basket during cooking. In the exemplary embodiment the through-holes 18 are all elliptical in shape. In the exemplary embodiment, the through-holes 18 are oriented in diagonal rows and extend from proximate from the junction of first side 12A and fourth side 12D to the junction of second side 12B and third side 12C, or from the junction of second side 12B and fourth side 12D to the junction of first side 12A with third side 12C. In alternative embodiments, these may stretch towards different sides or may have alternative shapes depending on the desired implementation. It will be understood that in other embodiments some or all of through-holes 18 may be of any other desired shape and arrangement.

One or more connector apertures 20 is defined in each of first side 12A and in second side 12B. The connector apertures 20 are arranged in opposed pairs and are provided to allow for engagement of the dividers 16 with basket portion 12, as will be later described herein. Each first connector aperture 20 on first side 12A is aligned with one of the second connector apertures 20 defined on second side 12B. Each connector aperture 20 is provided for engagement of an end of the one of the dividers 16 with the associated first side 12A or second side 12B. Each connector aperture 20 is generally rectangular in shape in the exemplary embodiment but it will be understood that in other embodiments the shape of the connector aperture 20 may be other than rectangular. In the exemplary embodiment first side 12A includes five connector apertures 20 that correspond and align with five connector apertures 20 on second side 12B. It will be understood that there may be only one pair, two pairs, three pairs, four pairs, five pairs, or more than five pairs of aligned second apertures provided on first side 12A and second side 12B of basket portion 12. The ultimate number of connector apertures 20 depends on the desired implementation.

As can best be seen in FIG. 4-FIG. 7, the outermost connector apertures 20 closest to the junction between first side 12A and each of third and fourth sides 12C, 12D and between second side 12B and each of third and fourth sides 12C, 12D are angled at an angle other than ninety degrees relative to bottom 12E. In one embodiment, these outermost connector apertures 20 are oriented at substantially the same angle as third and fourth sides 12C, 12D are oriented relative to bottom 12E. These outermost connector apertures 20 in the exemplary embodiment are angled at the angle $\alpha$ with respect to the bottom 12E of basket portion. In other words, the outermost connector apertures 20 are arranged substantially parallel to the inner surface of third side 12C and fourth side 12D, respectively. In alternative embodiments the angle may differ depending on the desired implementation.

Although no connector apertures 20 are illustrated as being provided on third side 12C and fourth side 12D, it will be understood that the sides 12C and 12D may additionally or alternatively provided with pairs of aligned connector apertures 20 that are arranged substantially similarly to the connector apertures 20 on first side 12A and second side 12B. Grill basket 10 may then be provided with additional or alternative dividers (other than or in addition to dividers 16) which are configured to engage in second apertures defined in third side 12C and fourth side 12D. Again, the number of pairs of connector apertures 20 that may be defined in third side 12C and fourth side 12D may be one or more pairs.

As best seen in FIGS. 1A to 5, basket portion 12 is provided with a plurality of engagement assemblies that enable handle 14 to be selectively removably engaged with basket portion 12 in different locations. The user will select a specific one of the engagement assemblies in order to use the grill basket in a first orientation and will select another of the engagement assemblies in order to use the grill basket in a second orientation that differs from the first orientation.

The engagement assemblies provided on basket portion 12 take the form of tabs that extend outwardly from an outer surface of the sides 12A through 12D of basket portion 12. The tabs and handle 14 are configured such that the handle 14 is able to be selectively and removably engaged with the tabs, as will be described further herein. To this end, first side 12A of basket portion 14 defines a pair of third apertures 22 therein. Third apertures 22 may be formed by die-cutting the metal of the first side 12A and folding out tabs 24 from first side 12A. Tabs 24 are arranged so as to extend outwardly from an outer surface of first side 12A. Similarly, a pair of fourth apertures 26 (FIG. 4) are defined in second side 12B of basket portion 14 and tabs 28 are formed in such a way as to extend outwardly from the outer surface of second side 12B. Each tab 24 defines an opening 24A (FIG. 2) therein. In the exemplary embodiment, the opening 24A is an elongate slot 24A (FIG. 2) but it will be understood that any desired shape of opening may be defined in first side 12A. Similarly, each tab 28 defines an opening 28A (FIG. 2) therein which may be in the configuration of an elongate slot 28A (FIG. 2). Each third aperture 22 and each fourth aperture 26 is generally D-shaped and the D-shapes of the apertures 22, 26 of each pair of apertures are arranged as mirror images of one another, with the arcuate curved regions of the apertures being laterally spaced from one another and the tabs being located remotely from one another. The tabs 24, 28 extend outwardly away from the outer surface of the associated first side 12A and second side 12B. The third apertures 22 and associated tabs 24 are laterally aligned with the fourth apertures 26 and associated tabs 28. The tabs 24, 28 are provided as engagement assemblies for selective and removable engagement of the handle 14 with basket portion 12. This engagement and removal will be described later herein.

Figure 4:
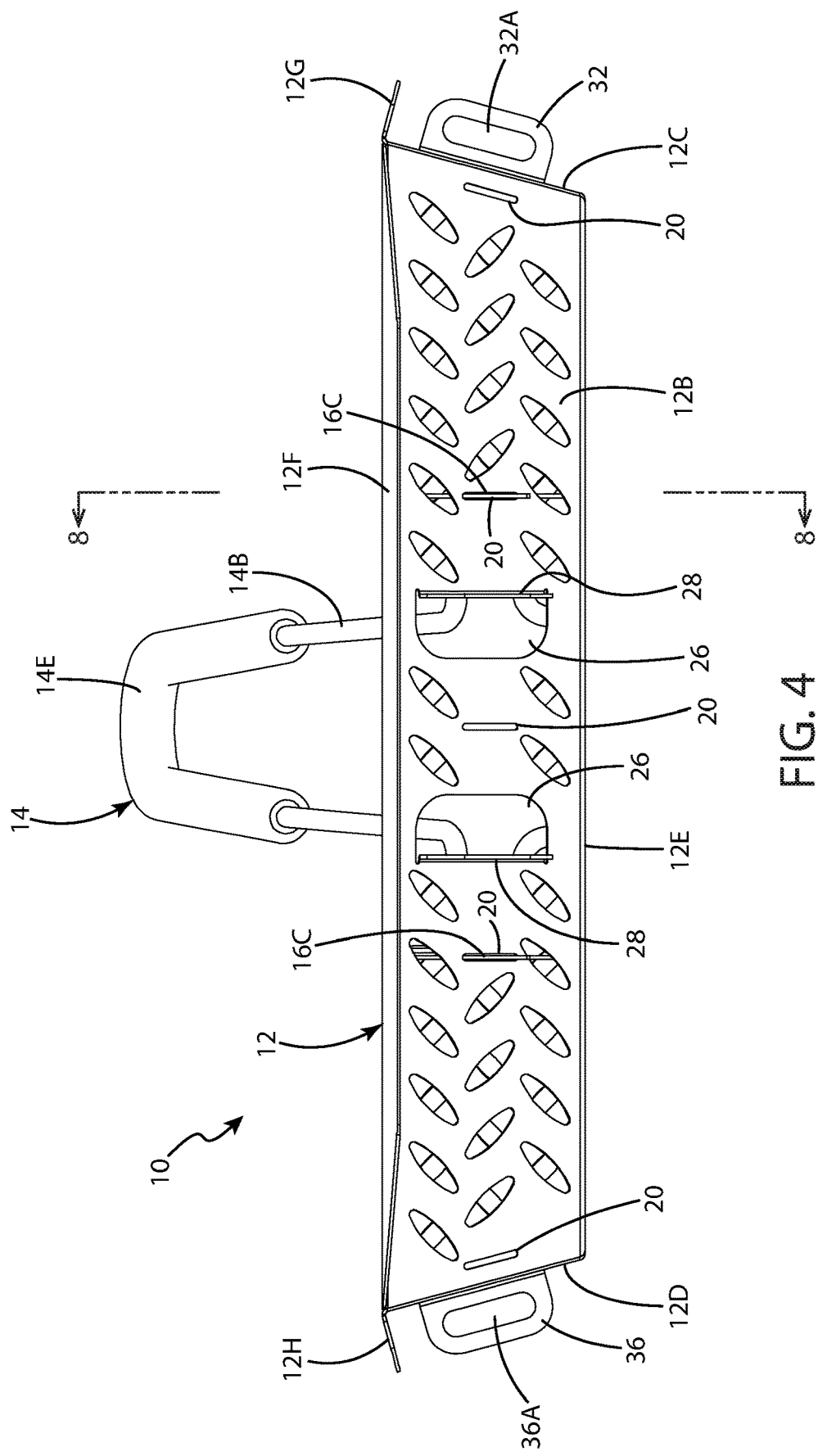
FIG. 4 is a rear elevation view of the grill basket.

In a similar fashion, a pair of fifth apertures 30 (FIG. 3) is defined in third side 12C of basket portion thereby forming corresponding tabs 32 that extend outwardly from an outer surface of third side 12C. Each tab 32 defines an opening 32A (FIG. 4) therein which may be in the shape of an elongate slot 32A. Still further, a pair of sixth apertures 34 (FIG. 2) is defined in fourth side 12D of basket portion, thereby forming corresponding tabs 36 which extend outwardly from the outer surface of the fourth side 12D. Each tab 36 has an opening 36A (FIG. 4) therein which in the exemplary embodiment is in the form of an elongate slot 36A (FIG. 4). Fifth apertures 30 and tabs 32 are longitudinally aligned with sixth apertures 34 and tabs 36. Tabs 32 and 36 comprise alternative engagement assemblies for selective and removable engagement of handle 14 so that grill basket is able to be used in a different orientation from when handle 14 is engaged with tabs 24 or 28.

Tabs 24, 28, 32, and 36 are provided for selective engagement of handle 14 with an associated one of the first side 12A, second side 12B, third side 12C, and fourth side 12D of basket portion 12. This engagement will be later described herein. In other embodiments, it will be understood that more than one set of tabs may be provided on each of any or all of the first side 12A, second side 12B, third side 12C and fourth side 12D such that a pair of handles may be engaged with the same side of the basket portion 12 at one time.

Handle 14 is selectively detachably engaged with basket portion 12. Handle 14 is configured in a similar manner to a pair of tongs in that the handle includes a first arm and a second arm which are able to be moved inwardly under force towards one another to reduce a gap between free ends of the arms. When the force is removed, the two arms return to their original condition under spring force and the gap between the free ends of the arms is increased. In the exemplary embodiment the handle is fabricated from a food grade silicone that is heat resistant. The two arms of the handle 14 are operative to flex inwardly towards one another when the user squeezes them together, as will be discussed with respect to operation of grill basket 10 later herein.

Referring particularly to FIG. 1B, handle 14 includes a grasping portion 14A which is generally U-shaped, having a common end that is rounded and two arm sections extending outwardly from the rounded end in generally a same direction. Each arm of the handle 14 further includes a stepped section 14B which extends outwardly from each arm section of the grasping portion 14A. Each arm of the handle 14 further includes an engagement region for engaging the handle 14 to the basket portion 12. In the exemplary embodiment, the engagement region on each arm of the handle 14 comprises a semi-circular region 14C which extends outwardly from each stepped section 14B. One or both of the arms of the handle 14 include a latching member to at least temporarily secure the handle 14 to the engagement assembly. In the exemplary embodiment a latching member is provided on each of the two arms of the handle 14 in the form of an extension tip 14D at a free end of the associated arm. The semi-circular region 14C terminates in the extension tip 14D.

The stepped section 14B of each arm of the handle 14 angles downwardly from the associated arm section of the grasping portion 14A. The stepped sections 14B flare outwardly away from one another moving in a direction away from the arm sections of grasping portion 14A. The stepped section 14B is arranged at an angle θ (FIG. 2) with respect to the associated arm section of the grasping portion 14A. In an exemplary embodiment, the angle θ may be from about 150 up to about 175 degrees. In another embodiment, the angle θ may be about 165 degrees.

Each semi-circular region 14C is generally C-shaped is arranged such that the C-shapes flare outwardly away from one another moving in a direction away from the stepped sections 14B. A first leg of each semi-circular region 14C is arranged at an angle Δ (FIG. 3) relative to the associated stepped section 14B. In the exemplary embodiment, the angle Δ is from about 120 degrees up to about 150 degrees. In another embodiment the angle Δ is about 135 degrees. It should be noted that the semi-circular regions 14C are arranged so that openings defined thereby are located proximate and opposite to one another. The two semi-circular regions 14C on handle 14 are horizontally aligned with one another because they are configured to be engaged with horizontally aligned tabs provided on the basket portion 12.

The grasping portion 14A of handle 14 is at least partially covered by a handle cover 14E. In the exemplary embodiment, the handle cover 14E is fabricated from rubber and is operative to remain at a sufficiently low enough temperature that allows a user to grasp the handle 14 in comfort even when the grill basket 10 is in operation. The rubber also ensures the user can maintain their grip on the handle 14.

Figure 5:
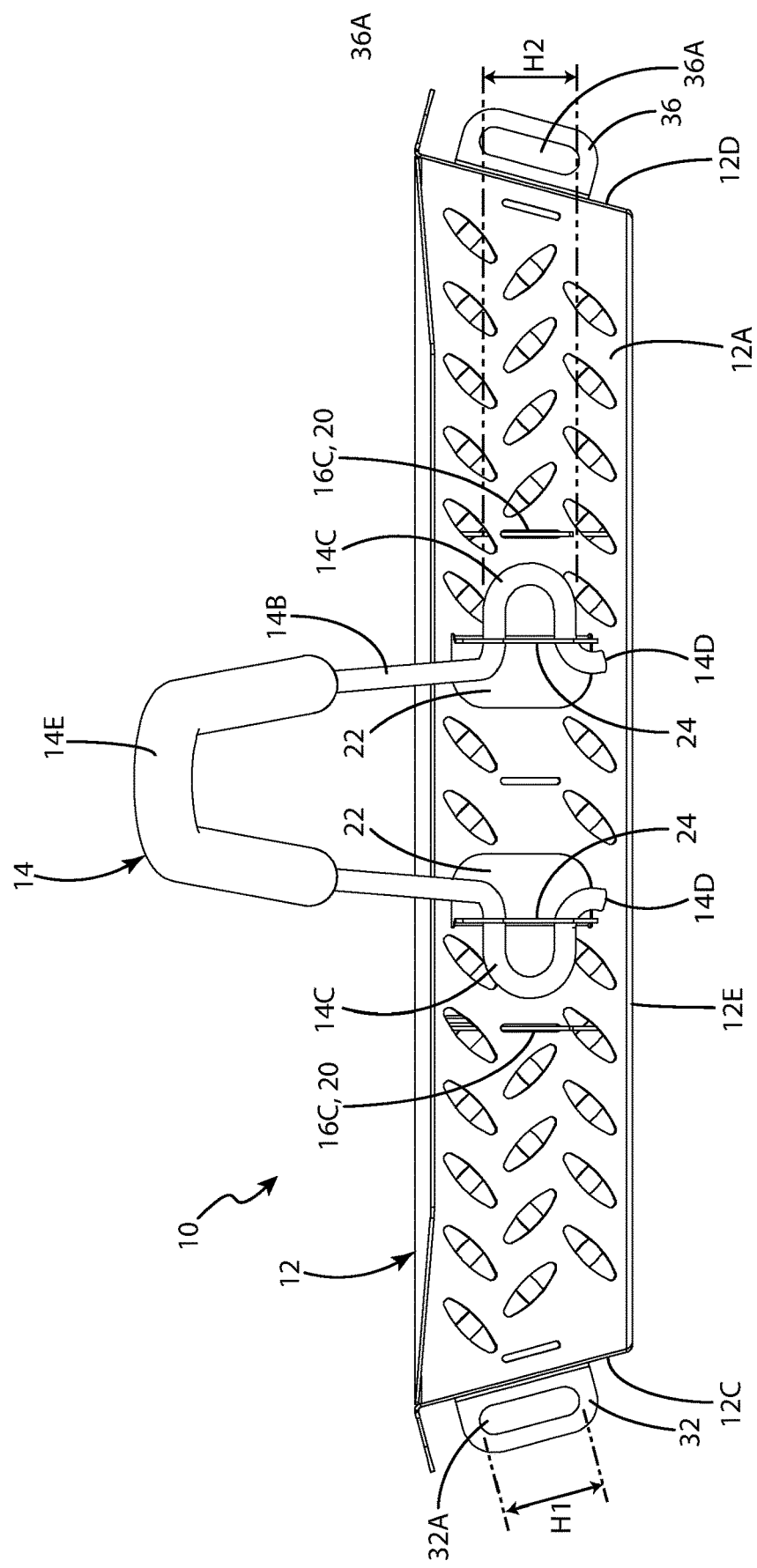
FIG. 5 is a front elevation view of the grill basket.

FIG. 5 also shows that the slots of each tab, such as slot 32A of tab 32 is of a height "H1" and each semi-circular region 14C of handle 14 is of a height "H2" that is slightly less than the height "H1". When handle 14 is to be engaged with tabs, such as tabs 32, the user will apply squeezing pressure to the arms of grasping portion 14A. This squeezing pressure will cause arms sections of the grasping portion, the stepped sections 14B, and semi-circular regions 14C to move toward one another. The semi-circular regions 14C are then positioned between the tabs on one of the sides of the basket portion 12. For example, as shown in FIG. 5, the semi-circular regions 14C have been positioned between the tabs 24 of first side 12A. The semi-circular regions 14C are aligned with the slots 24A (shown in FIGS. 2 and 3) of tabs 24 and the squeezing pressure on the arms of grasping portion 14A is released. The release of the pressure allows semi-circular regions 14C to return to their original at-rest position and as the semi-circular regions 14C to this, they slide through slots 24A.

As indicated earlier herein a latching member in the form of an extension tip 14D extends outwardly from each semi-circular region 14C and forms a hooked region at the free end of the associated arm of the handle 14. When semi-circular regions 14C are received through the slots, such as slots 24A of tabs 24 the configuration of the extension tip 14D is such that the extension tip 14D cannot move through the slot 24A and, instead, abuts the inner surface of the tab 24. The handle 14 is held in connective engagement with the engagement assembly by friction (of the extension tip 14D contacting the tab) and by spring force from the arms of handle 14 returning to their original or at-rest position. The combination of friction and spring force tends to lock each semi-circular region 14C of the handle 14 to the associated tab 24, and thereby secures the handle 14 to the basket portion 12.

When it is desired to remove handle 14 from basket portion 12, the user will hold the grasping portion 14A of handle 14 in their hand and will squeeze the arm sections of grasping portion 14A towards one another. This squeezing motion causes the semi-circular regions 14C to slide out of the slots 24A of the tabs 24 and thereby out of locking engagement with tabs 24. The handle 14 may then be lifted free from basket region 12. If desired, and as will be described later herein, handle 14 may be engaged with a different engagement assembly provided on basket portion 12, i.e., with a different set of tabs and their associated slots, such as tabs 32 and their associated slots 32A.

It will be understood that in alternative embodiments the third, fourth and fifth, and sixth apertures 22, 26, 30, and 34 may be shaped different from the "D" shape illustrated and described herein and that as a consequence, the associated tabs 24, 28, 32, and 36 will be complementary in shape to the differently configured apertures. Additionally, the shape of the opening defined in each of the tabs 24, 28, 32, and 36 (or the alternatively and differently configured tabs) may be other than the elongate slots illustrated in the attached figures. The differently configured tabs and associated openings may therefore be capable of engaging with a handle that has engagement regions thereon that are complementary in configuration to the differently-shaped openings and are thereby able to engage therewith. The engagement regions of handle 14) will be configured so as to be capable of being selectively connected to any differently configured engagement assemblies provided on the basket portion 12 of grill basket 10.

Referring to FIG. 1B, one or more dividers 16 are provided for selective engagement with grill basket 10 to subdivide interior 12M into smaller compartments. Each divider 16 is a planar plate that is selectively engaged in aligned pairs of connector apertures 20 of basket portion 12. Each divider 16 has a first end 16A and a second end 16B horizontally opposed to the first end 16A. When engaged with basket portion 12, divider 16 spans from first side 12A to second side 12B of basket portion 12, as is shown in FIG. 1a. Both the first end 16A and the second end 16B are configured to include a projection 16C. The projection 16C comprises a hook, particularly a triangular hook that extends outwardly from the respective first end 16A and second end 16B. The triangular hook is oriented such that an apex of the V-shaped, triangular hook extends outwardly and downwardly towards a bottom end of divider 16 and away from a top end of divider 16. The projection 16C, seen best in FIG. 1B, is configured to be received through connector aperture 20 and to extend for a short distance below the connector aperture 20 so as to secure divider 16 to the associated first side 12A or second side 12B of the basket portion 12. Divider 16 also has a first surface 16D and a second surface 16E opposed to the first surface 16D. The first and second surfaces 16D, 16E extend from first end 16A to second end 16B. Divider 16 further includes projection 16F that extends outwardly from one of the first surface 16D and second surface 16E and a complementary indentation 16G formed in the other of the first surface 16D and second surface 16E. The indentation 16G extends into the projection 16F and is configured to receive fingertips of a user therein while their thumb engages the projection 16F or vice versa. The indentation 16G and projection 16F, together, form a gripping region on the divider 16 which enables a user to grasp and manipulate the divider 16. Divider 16 furthermore defines a plurality of apertures 16H that extend between first surface 16C and second surface 16D. Apertures 16h may be similarly configured to through-holes 18 in first side 12A, second side 12B, third side 12C, and fourth side 12D. In the exemplary embodiment the apertures 16H are similar in size, shape, and pattern to those in the basket portion 12 as discussed earlier.

Referring now to FIG. 1A through FIG. 16 the operation of grill basket 10 and the reorganization of grill basket 10 into different configurations and orientations will now be described.

Figure 9:
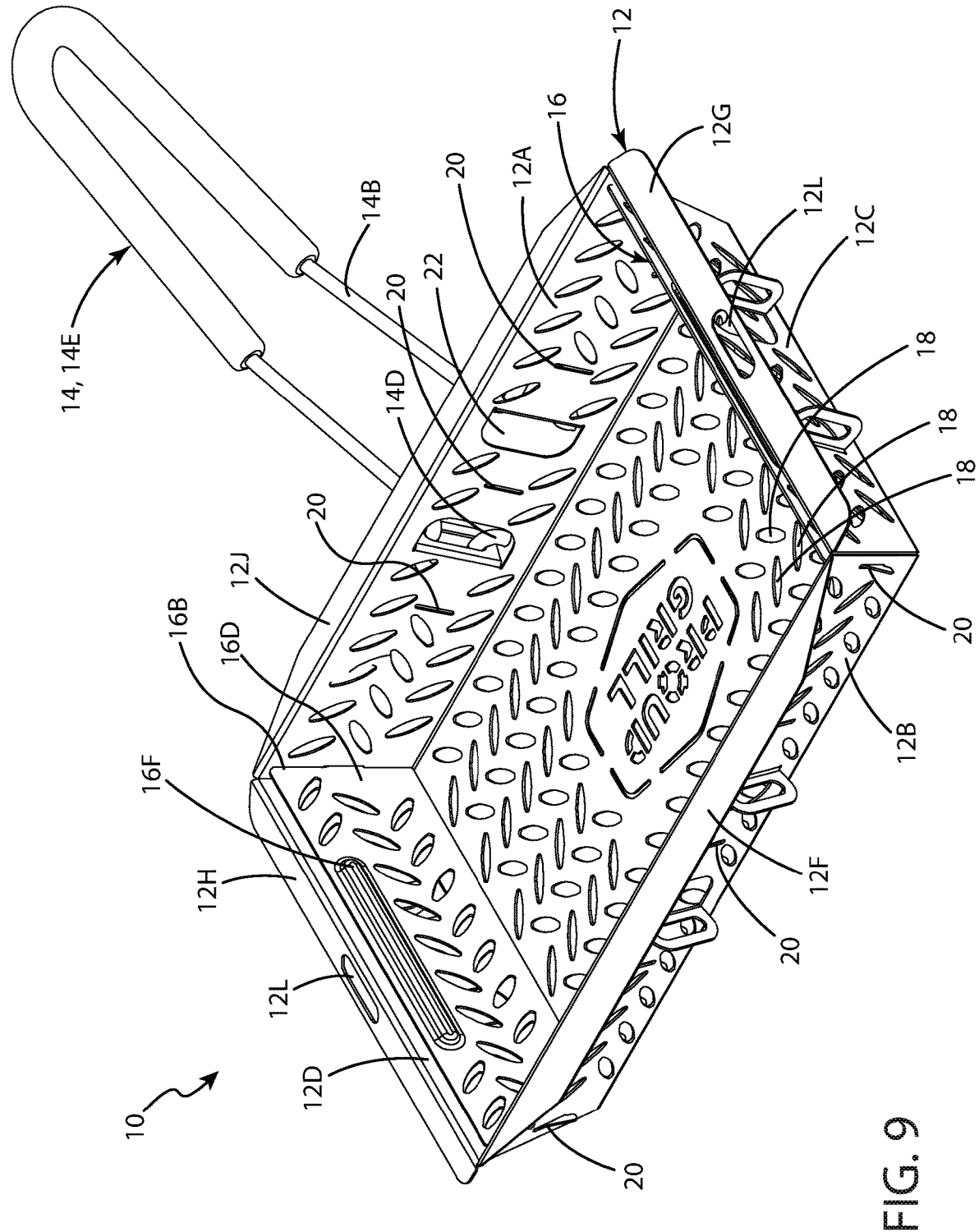
FIG. 9 is a top, left side, rear perspective view of the grill basket of FIG. 1A with dividers removed therefrom.
Figure 10:
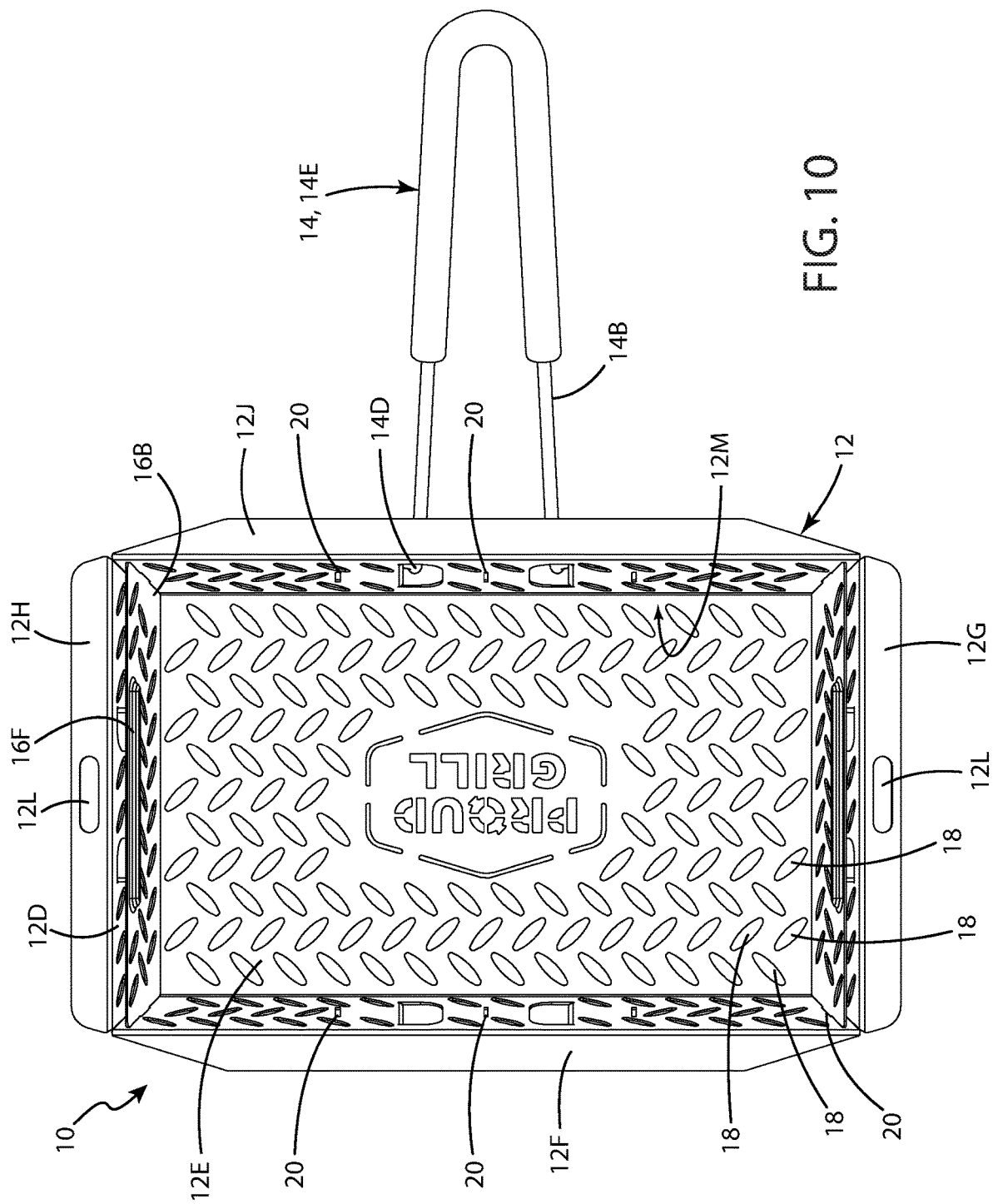
FIG. 10 is a top plan view of the grill basket of FIG. 9.

Referring now to FIG. 9 and FIG. 10, a first configuration of grill basket 10 is shown. In this particular instance the user has selected two dividers 16 and has engaged the dividers 16 into the angled outermost connector apertures 20 located proximate third side 12C and 12D. This arrangement effectively stores the dividers 16 within the grill basket 10 and allows for the maximum size compartment space of interior 12M for cooking food. Items of food will be placed on the upper surface of bottom 12E of basket portion 12 for cooking. (In an alternative configuration, one or both of the dividers may be completely removed from their engagement with first side 12A and second side 12B.) In either instance a single cooking compartment is provided by grill basket 10 with that single cooking compartment essentially being of the maximum length and width (or close to the maximum length and width) of bottom 12E.

FIGS. 9 and 10 also show the handle 14 in a first position, engaged with the first side 12A via the tabs 24. Handle 14 is engaged with tabs 24 by squeezing the arms of grasping section 14A (FIG. 1B) thereof so that they move inwardly towards one another, reducing the space between the outermost region of the two semi-circular regions 14C of handle 14. The grasping portion 14A is squeezed to the point that the two semi-circular regions 14C of handle can fit between the opposing inner surfaces of the two tabs 24. The semi-circular regions 14C (which are of a thickness narrower than the slots 24A of tabs 24) are then aligned with slots 24A and the user stops squeezing the grasping portion. The release of the pressure permits the semi-circular regions 14C to slide through the slots 24A and the outward movement through slots 24A continues until the extension tips 14D contact the opposed inner surface of the tabs 24. The extension tip 14D extends beyond the slot 24A in order to frictionally hold the semi-circular region 14C in engagement with the associated tab 24.

At that point the handle 14 is engaged and locked to the basket portion 12 to a sufficient degree that the grill basket 10 can be lifted, carried, and otherwise manipulated.

As indicated earlier herein, basket portion 12 is generally rectangular in shape. The manner in which basket portion 12 is illustrated shows the longer two sides of the basket portion 12 are first side 12A and second side 12B. The shorter two sides of the basket portion 12 are third side 12C and fourth side 12D. Grill basket 10 has a longitudinal axis that extends between third side 12C and fourth side 12D and is parallel to the upper edge of first side 12A and second side 12D. Grill basket 10 has a lateral axis that extends between first side 12A and second side 12D and is parallel to the upper edge of third side 12C and fourth side 12D. FIG. 10 shows that dividers 16 are oriented generally parallel to the lateral axis and that handle 14 is oriented generally at right angles to the longitudinal axis (and thereby parallel to the lateral axis). Grill basket 10 with dividers 16 engaged at their furthest position away from one another is suitable for grilling larger pieces of food or for grilling a single type of food. For example, a whole steak may be placed on the bottom 12E of the compartment 12M for cooking or a quantity of vegetables may be placed on bottom 12E for cooking.

Figure 11:
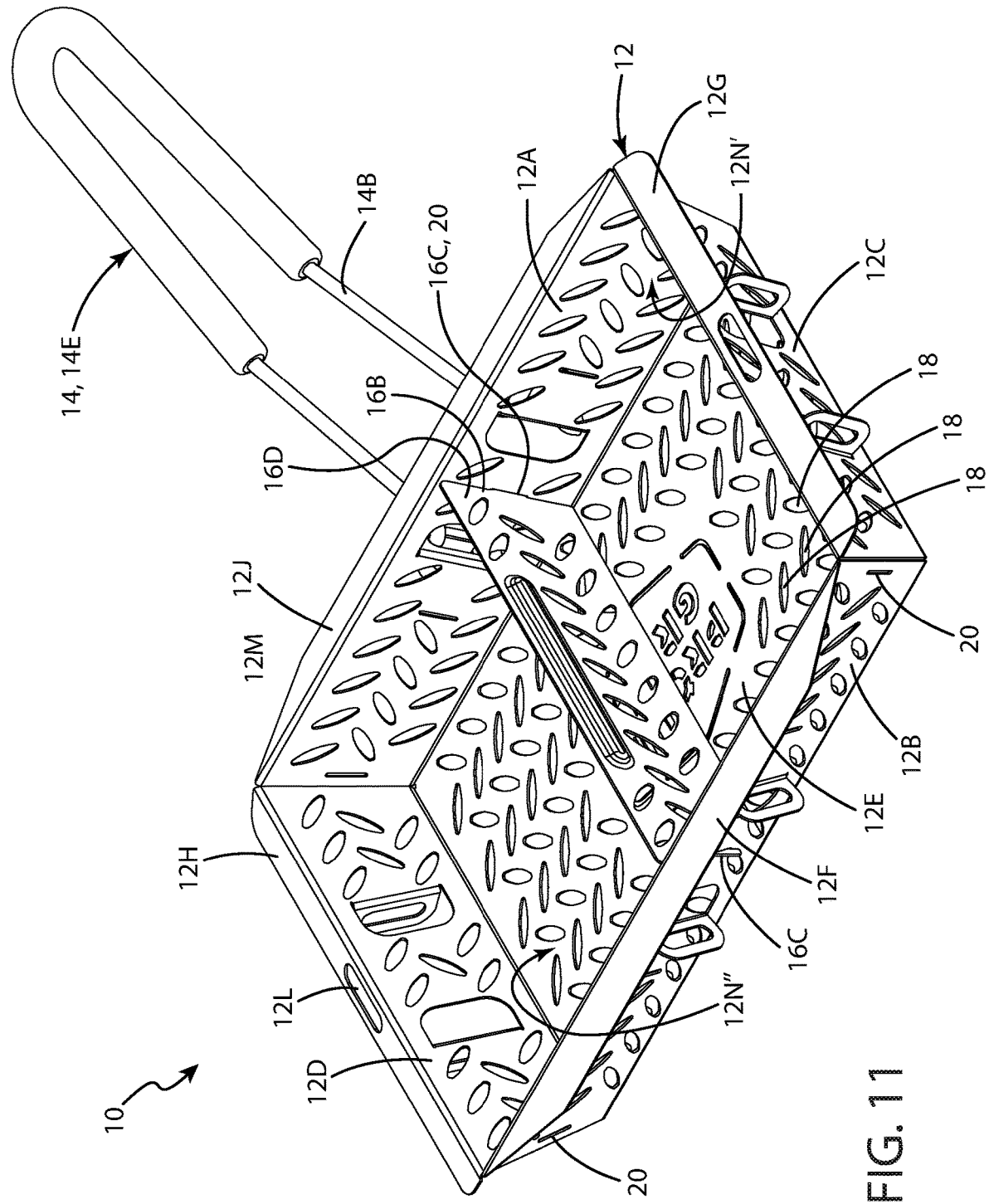
FIG. 11 is a top, left side, rear perspective view of the grill basket of FIG. 1A showing only a single divider engaged therewith to form two compartments.
Figure 12:
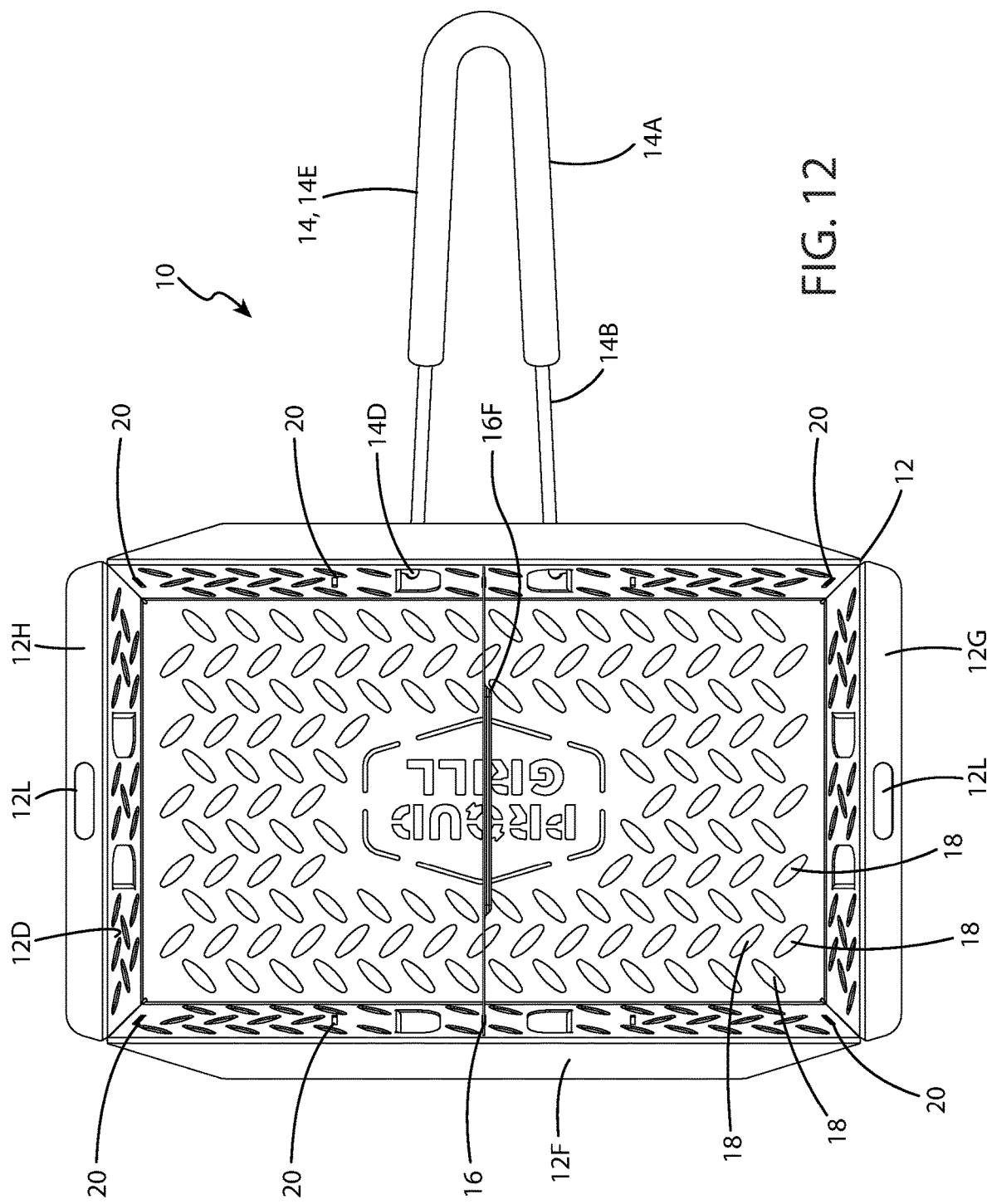
FIG. 12 is a top plan view of the grill basket of FIG. 11.
Figure 17:
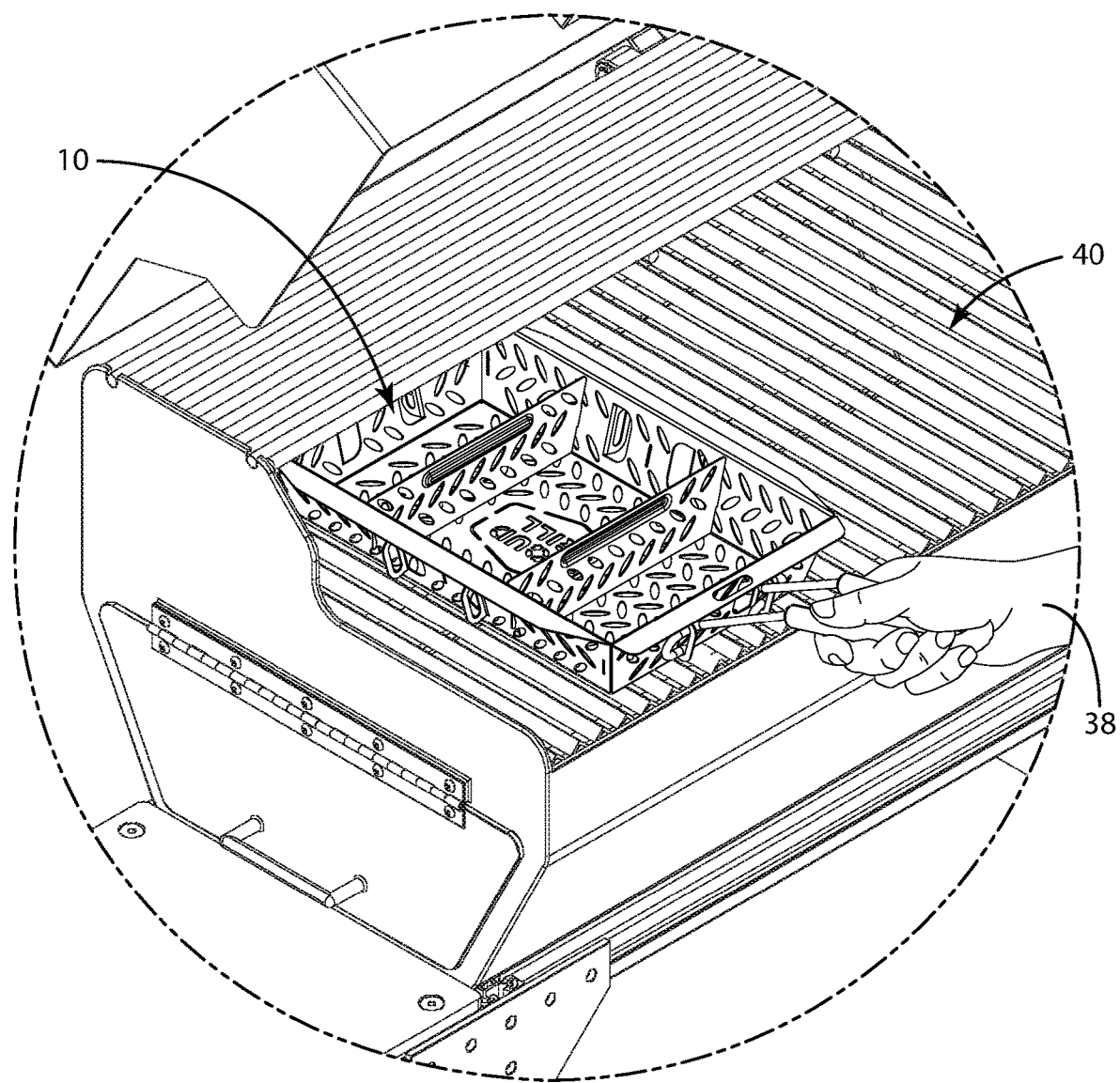
FIG. 17 is a top, left side, rear perspective view of the grill basket shown in a second operational orientation where the handle is engaged in either of the second position and the fourth position.

Referring now to FIG. 11 and FIG. 12, a second configuration of the grill basket 10 is shown. In this configuration, the user has engaged only one divider with the basket portion 12 in a central location, i.e., in the aligned center connector apertures 20 located between the third apertures 22 and between the fourth apertures 26. The center connector apertures 20 are located equidistant from third side 12C and fourth side 12D. This arrangement causes the divider 16 engaged with the center connector apertures 20 to divide the interior 12M in half, i.e., into two equally sized compartments 12N' and 12N". This arrangement allows for the bottom 12E to provide equally-sized surfaces to cook two different foodstuffs next to one another or to cook two larger pieces of food separately from one another. For example, one compartment 12N' may hold a steak and the other compartment 12N" may hold vegetables. FIGS. 11 and 12, like FIGS. 9 and 10, show handle 14 engaged with first side 12A and therefore the grill basket 10 is able to be oriented with its longitudinal axis parallel to a front end of a barbeque grill as illustrated in FIG. 17.

Referring now to FIG. 1A and FIG. 13-15, further alternative configurations of grill basket 10 are shown. These figures show two dividers 16 engaged with basket portion 12. In this particular instance the dividers 16 are shown engaged in the connector apertures 20 which are located between one of the aligned tab pairs 24, 28 and the angled outermost connector apertures 20 proximate third wall 12E, and the other of the aligned tab pairs 24, 28 and the other angled outermost connector apertures 20 proximate fourth wall 12F. This arrangement causes the compartment 12M to be divided into three equally-sized smaller compartments 12P', 12P", and 12P'''. The three smaller compartments could each separately be used to hold one of a smaller piece of fish, a smaller piece of chicken, and a smaller piece of steak for cooking.

Figure 13:
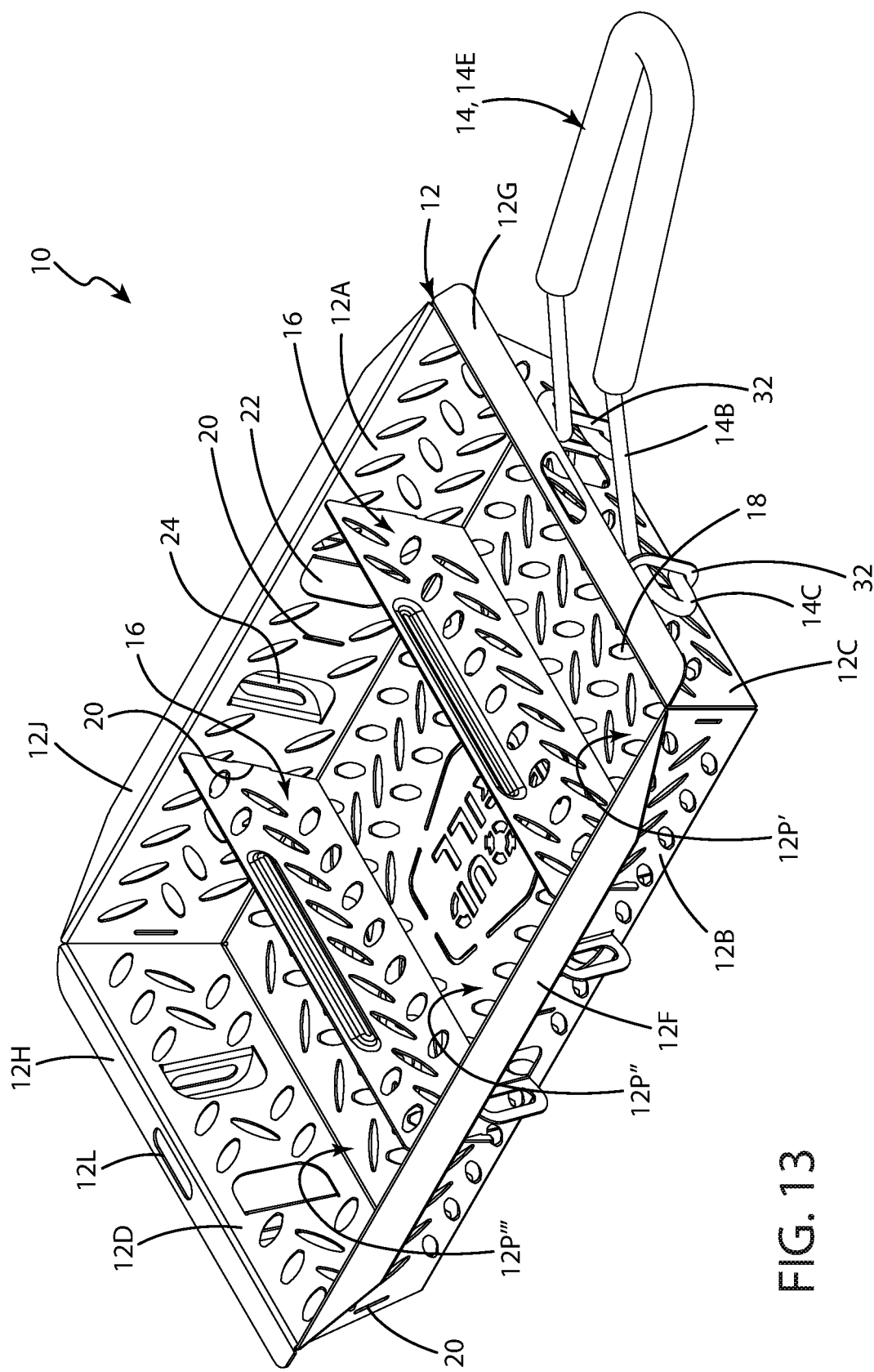
FIG. 13 is a top, left side, rear perspective view of the grill basket of FIG. 1A with the handle engaged therewith in a second position.

In other further alternative configurations, one of the dividers 16 could be located as illustrated in FIG. 11 (in the centrally-located connector apertures 20) and one of the dividers could be located as illustrated in FIG. 13. This arrangement (which is not shown herein) would result in one larger compartment equivalent to compartment 12N', one smaller compartment equivalent to compartment 12P''', and one even smaller compartment located between the compartments 12N' and 12P'''. Each of these differently sized compartments could be utilized to cook a different foodstuff. It will be understood that the user can lift any divider 16 out of basket portion 12 using the indentation 12F to better grip divider 16 and can then reposition and secure the divider 16 in another desired location within basket portion 12.

FIG. 13 shows handle 14 moved to a second position on basket portion 12. In order to remove handle 14 from the first position (shown in FIG. 9), the user will squeeze the grasping portion 14A of handle 14 until the two semi-circular regions 14C are free of slots 24A. Handle 14 in FIG. 13 is shown engaged with tabs 36 on fourth side 12D of basket portion. Handle 14 is engaged with tabs 36 by squeezing the grasping portion 14A of handle 14 until the two semi-circular regions 14C are moved towards one another to a sufficient degree to fit between the two spaced-apart tabs 36 and the semi-circular regions 14C are aligned with slots 36A of tabs 36. The user then stops squeezing grasping portion 14A and semi-circular regions 14C slide through slots 36A and become locked to tabs 36 via spring force and extension tips 14D.

Figure 14:
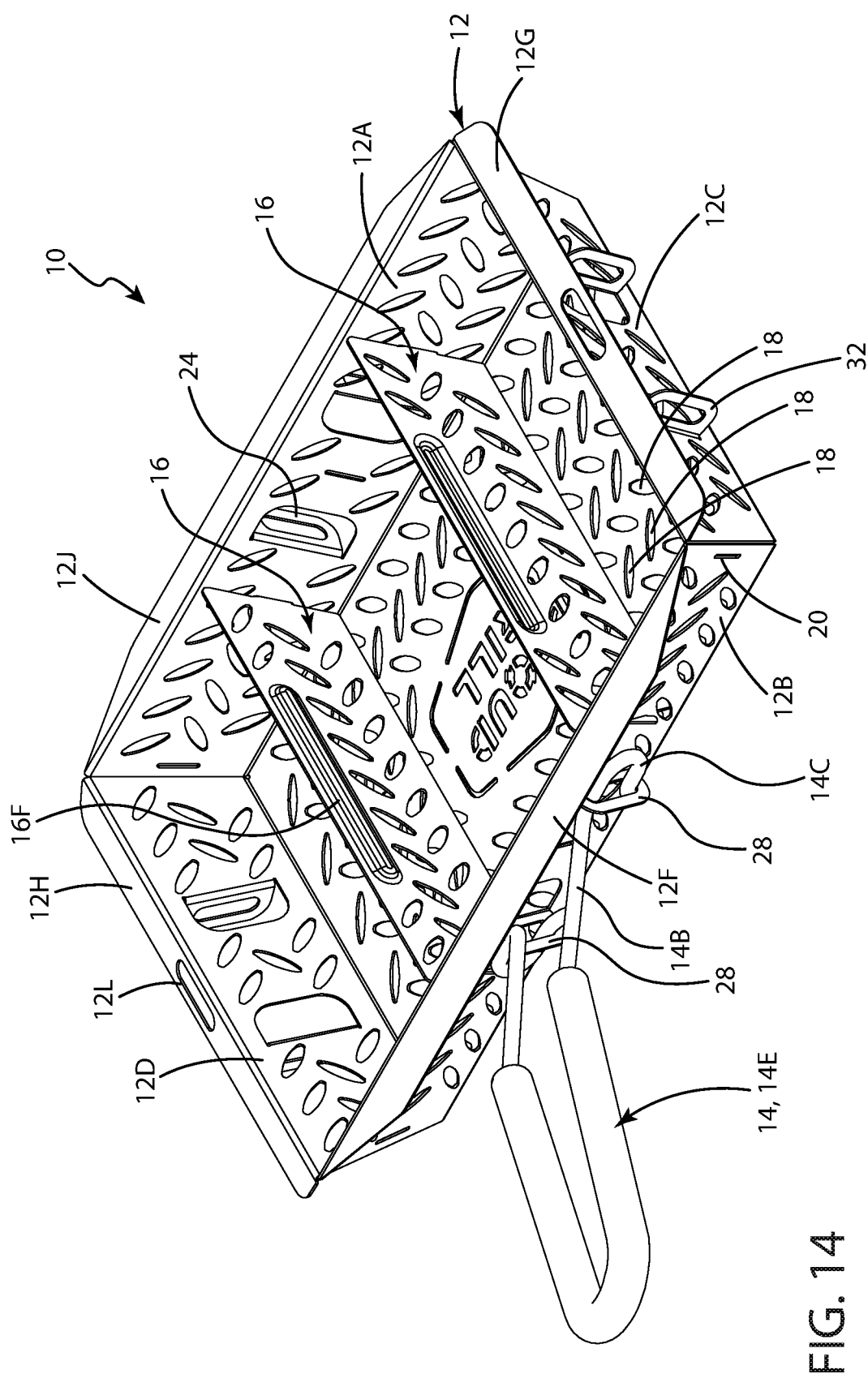
FIG. 14 is a top, left side, rear perspective view of the grill basket of FIG. 1A with the handle engaged therewith in a third position.
Figure 15:
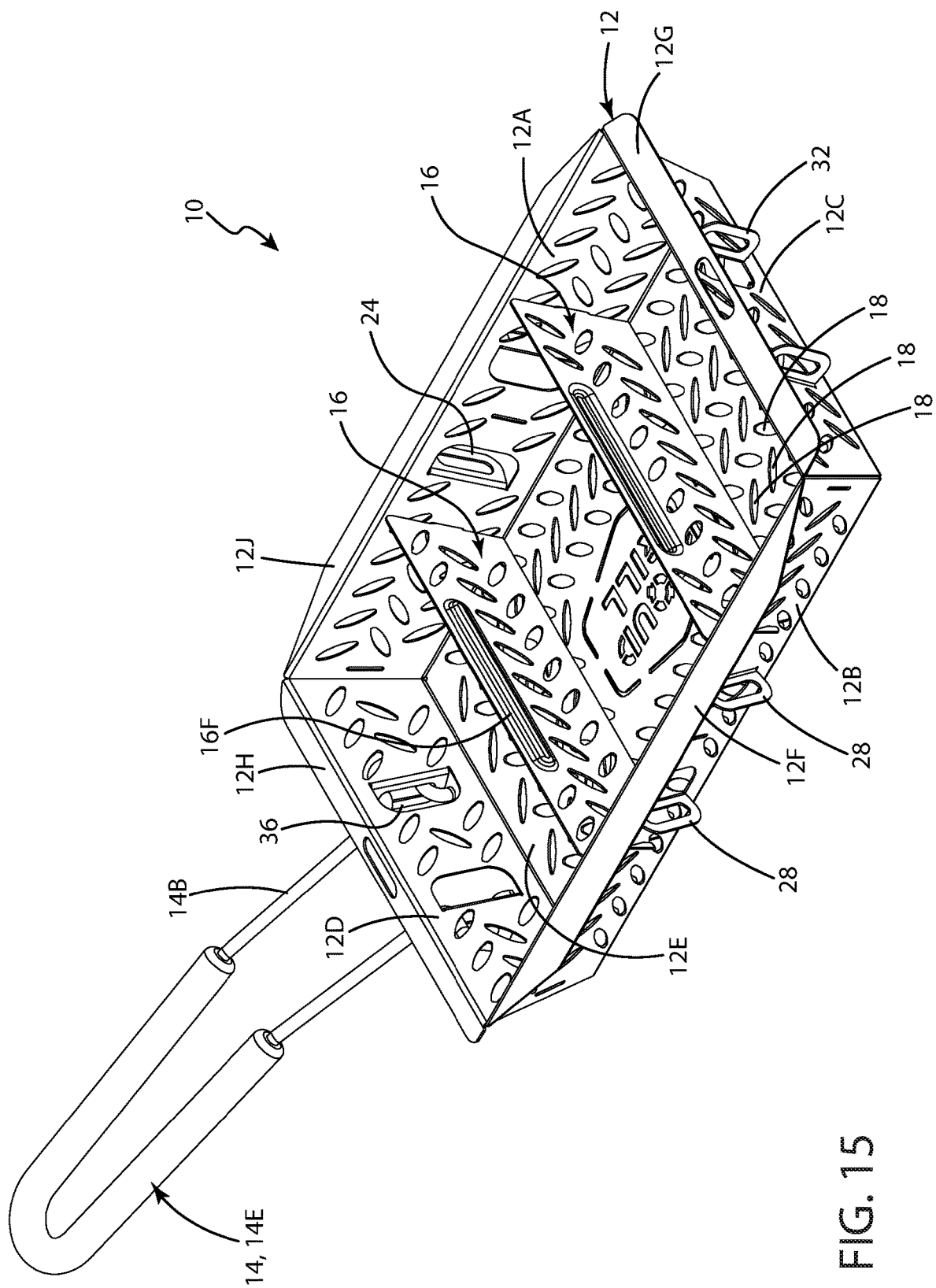
FIG. 15 is a top, left side, rear perspective view of the grill basket of FIG. 1A with the handle engaged therewith in a fourth position.

FIG. 14 shows handle 14 moved to a third position on grill basket 10, namely where handle is engaged with tabs 28 extending outwardly from second side 12B. FIG. 15 shows handle 14 moved to a fourth position on grill basket, namely where handle is engaged with tabs 32 on third wall 12C. Moving handle 14 between the first position, the second position, the third, position, and the fourth position is quick and easy requiring only that squeezing finger pressure be used to withdraw the handle from its engagement with the tabs on any particular side 12A through 12D of basket portion 12, that the squeezed handle be inserted between the two tabs on the selected other of the sides 12A through 12D, and then the squeeze pressure is released to permit the handle 14 to lock securely to basket portion 12. Handle 14 may be moved freely to any of these positions prior to or during a cooking operation. For instance, referring specifically to FIG. 17, a user 38 is using a grill 40. The grill basket 10 (without food being illustrated therein) is placed on the grate of the barbeque grill 40. The user 38 has the handle 14 in the second position on basket portion. While cooking, the user 38 decides it could be advantageous to reorient the grill basket 10 on the grate of barbeque grill 40. FIG. 17 shows the first side 12A of the basket portion 12 oriented parallel to the front of the barbeque grill. The user may squeeze the grasping portion 14A of handle 14 to disengage the handle 14 from first side 12A. The basket portion 12 may then be rotated on the barbeque grill to present the fourth side 12D of the basket portion 12 parallel to the front of the barbeque grill. The user is then able to reengage the handle 14 with tabs 32 of basket portion 12 as previously described and continue cooking the food in grill basket 10. This moving of the handle 14 may be repeated or changed at any time before, during, or after the cooking process. The handle cover 14E is operative to deflect or otherwise dissipate heat from handle 14, allowing for the afore-mentioned handle position changes during cooking or while grill basket 10 may still be hot or warm. Additionally, dividers 16 can readily be withdrawn and repositioned within basket portion at any time but preferably prior to placing foodstuffs into the interior compartment(s) thereof.

Figure 16:
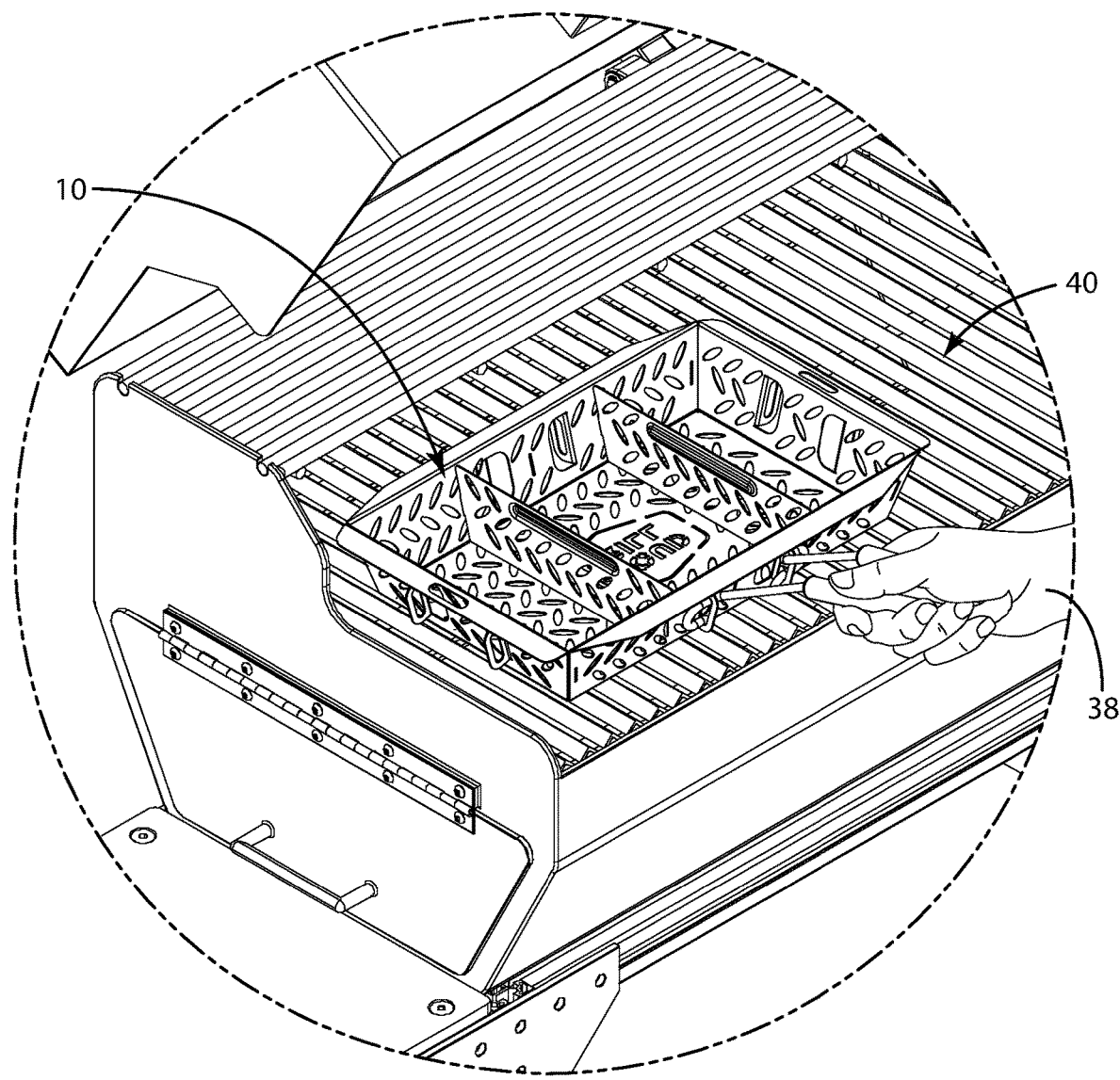
FIG. 16 is a top, left side, rear perspective view of the grill basket shown in a first operational orientation where the handle is engaged in either of the first position and the third position.

Referring to FIGS. 16 and 17 it should be noted that connecting the handle 14 of grill basket with a first engagement assembly (e.g. tabs 24 or 28) orients the basket portion 12 in a first orientation such as is illustrated in FIG. 16. Connection of the handle 14 with A second engagement assembly (e.g. tabs 32 or 36) will orient the basket portion 12 in a second orientation such as is illustrated as in FIG. 17. In the rectangular basket portion 12 illustrated in the attached figures, the first side 12A and second side 12B of the basket portion 12 are at right angles to the third side 12C and the fourth side 12D. Consequently, when the first engagement assembly is provided on the first side 12A or the second side 12B of the basket portion 12, and the second engagement assembly is provided on the third side 12C or the fourth side 12D of the basket portion 12, then the first orientation of the basket portion 12 as shown in FIG. 16 is at right angles to the second orientation of the basket portion 12 as shown in FIG. 17.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or will be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected," "attached" or "coupled" to another feature or element, it can be directly connected, attached or coupled to the other feature or element or intervening features or elements may be present. In contrast, when a feature or element is referred to as being "directly connected," "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under," "below," "lower," "over," "upper," "above," "behind," "in front of," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly," "downwardly," "vertical," "horizontal," "lateral," "transverse," "longitudinal," and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may," "might," or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc.

Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A grill basket comprising:
   a basket portion having:
      a bottom;
      a side wall extending upwardly from the bottom, wherein the side wall and the bottom bound and define an interior compartment;
   a first engagement assembly provided on the side wall;
   a second engagement assembly provided on the side wall spaced from the first engagement assembly;
   a handle;
   wherein the handle is operative to be selectively removably connected to the basket portion via one of the first engagement assembly and the second engagement assembly; and
   wherein connection of the handle with the first engagement assembly orients the basket portion in a first orientation, and connection of the handle with the second engagement assembly orients the basket portion in a second orientation.

2. The grill basket according to claim 1, wherein the side wall includes a first side and a second side of the basket portion which are at right angles to a third side and a fourth side; and wherein when the handle of the first engagement assembly is provided on the first side or the second side, and the second engagement assembly is provided on the third side or the fourth side, then the first orientation of the basket portion is at right angles to the second orientation of the basket portion.

3. The grill basket according to claim 1, wherein each of the first engagement assembly and the second engagement assembly includes at least one tab which extends outwardly from an outer surface of the side wall;
   wherein the at least one tab defines an opening therein; and
   wherein a portion of the handle is received through the opening.

4. The grill basket according to claim 3, wherein the handle includes an arm with a free end and an engagement region positioned inwardly of the free end; and wherein the engagement region of the handle is received through the opening.

5. The grill basket according to claim 4, wherein the engagement region is arcuate.

6. The grill basket according to claim 4, further comprising a latching member provided on the handle.

7. The grill basket according to claim 6, wherein the latching member comprises an extension tip provided at the free end of the arm, wherein the extension tip prevents the free end of the arm from moving through the opening.

8. The grill basket according to claim 1, wherein the handle comprises a first arm and a second arm extending outwardly from a common end in generally a same direction, wherein each of the first arm and the second arm has an engagement region positioned inwardly of a free end; and wherein the engagement region of the handle is configured to be releasably connected to the one of the first engagement assembly and the second engagement assembly.

9. The grill basket according to claim 1, wherein each of the first engagement assembly and the second engagement assembly comprises a first tab and a second tab extending outwardly from an associated first side, and a second side of the side wall, wherein each of the first tab and the second tab defines an opening therein, and wherein an engagement region of a first arm of the handle is receivable in the opening of the first tab and an engagement region of a second arm of the handle is receivable in the opening of the second tab.

10. The grill basket according to claim 1, wherein the bottom, a first side, a second side, a third side, and a fourth side of the side wall define the interior compartment, and wherein the grill basket further comprises:
   at least one divider that is removably engageable with the basket portion to divide the interior compartment into smaller compartment sections.

11. The grill basket according to claim 1, wherein the side wall further comprises:
   a third side, a fourth side extending upwardly and outwardly from the bottom;
   wherein the first side and the second side are opposed;
   wherein the third side and the fourth side are opposed and extend between the first side and the second side;
   wherein the interior compartment is defined by inner surfaces of the bottom, the first side, the second side, the third side, and the fourth side; and
   wherein the grill basket further comprises at least one divider that is removably engageable with the basket portion to divide the interior compartment into smaller compartment sections.

12. The grill basket according to claim 11, one or more first connector apertures defined in the first side; and
   one or more second connector apertures defined in the second side; wherein each of the one or more first connector apertures is aligned with one of the one or more second connector apertures.

13. The grill basket according to claim 12, wherein a first projection is provided on a first end of the at least one divider and a second projection is provided on a second end of the at least one divider; and
   wherein the first projection is engaged in one of the one or more first connector apertures and the second projection is engaged in one of the one or more second connector apertures to secure the at least one divider to the basket portion.

14. The grill basket according to claim 13, wherein each of the first projection and the second projection on the at least one divider comprises a triangular hook that extends outwardly from the respective one of the first end and the second end of the at least one divider.

15. The grill basket according to claim 12, wherein the one or more first connector apertures includes a center connector aperture defined in the first side and located equidistant between the third side and the fourth side;
  wherein the one or more second connector apertures includes a center connector aperture defined in the second side and located equidistant between the third side and the fourth side; and
  wherein when the at least one divider comprises a single divider that is removably engaged with the center connector aperture on the first side and the center connector aperture on the second side the compartment is divided in half by the single divider.

16. The grill basket according to claim 15, wherein the one of the third side and the fourth side is oriented at an obtuse angle relative to an inner surface of the bottom and the outermost connector aperture on the first side and the outermost connector aperture on the second side are oriented at the obtuse angle relative to the inner surface of the bottom.

17. The grill basket according to claim 12, wherein the one or more first connector apertures includes an outermost connector aperture defined in the first side and located proximate one of the third side and the fourth side;
  wherein the one or more second connector apertures includes an outermost connector aperture defined in the second side and located proximate the one of the third side and the fourth side; and
  wherein the at least one divider is removably engaged with the outermost connector aperture on the first side and the outermost connector aperture on the second side.

18. The grill basket according to claim 11, wherein a plurality of through-holes are defined in one or more of the first side, the second side, the third side, the fourth side, and the bottom of the basket portion and the through-holes extend between an inner surface and outer surface of the basket portion, and wherein a further plurality of through-holes are defined in the at least one divider and extend between a first surface and a second surface of the at least one divider.

19. The grill basket according to claim 1, wherein a first side and a second side of the side wall are oriented at an angle to one another.

* * * * *